US012246968B2

(12) United States Patent
Nandwana et al.

(10) Patent No.: US 12,246,968 B2
(45) Date of Patent: Mar. 11, 2025

(54) OLEOPHILIC HYDROPHOBIC MAGNETIC POROUS MATERIALS

(71) Applicant: Northwestern University, Evanston, IL (US)

(72) Inventors: Vikas Nandwana, Evanston, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 913 days.

(21) Appl. No.: 17/417,684

(22) PCT Filed: Dec. 20, 2019

(86) PCT No.: PCT/US2019/067839
§ 371 (c)(1),
(2) Date: Jun. 23, 2021

(87) PCT Pub. No.: WO2020/142267
PCT Pub. Date: Jul. 9, 2020

(65) Prior Publication Data
US 2022/0118422 A1    Apr. 21, 2022

Related U.S. Application Data

(60) Provisional application No. 62/788,347, filed on Jan. 4, 2019, provisional application No. 62/788,321, filed on Jan. 4, 2019.

(51) Int. Cl.
B32B 9/00      (2006.01)
B01J 20/06     (2006.01)
(Continued)

(52) U.S. Cl.
CPC ............. C01B 32/22 (2017.08); B01J 20/06 (2013.01); B01J 20/20 (2013.01); B01J 20/262 (2013.01);
(Continued)

(58) Field of Classification Search
CPC ....... Y10T 428/30; C01B 32/22; C01B 32/20; C10G 25/003; C10G 25/006; B01J 20/06;
(Continued)

(56) References Cited

U.S. PATENT DOCUMENTS 9,911,974 B2      3/2018   de Guzman et al.
2003/0224168 A1   12/2003  Mack et al.
(Continued)

FOREIGN PATENT DOCUMENTS

CN    103965835 A      8/2014
KR    2014 0073720 A   6/2014
(Continued)

OTHER PUBLICATIONS

The extended European Search Report issued on Jan. 26, 2022 for EP Patent Application No. 19907789.2; pp. 1-11.
(Continued)

Primary Examiner — Daniel H Miller
(74) Attorney, Agent, or Firm — Bell & Manning, LLC

(57) ABSTRACT

Oleophilic-hydrophobic-magnetic (OHM) porous materials are provided. In embodiments, an OHM porous material comprises a porous substrate having a solid matrix defining a plurality of pores distributed through the solid matrix, the OHM porous material further comprising a coating of a nanocomposite on surfaces of the solid matrix. The nanocomposite comprises a multilayer stack of a plurality of layers of a two-dimensional, layered material having nucleation sites interleaved between a plurality of layers of magnetic nanoparticles, wherein individual layers of magnetic nanoparticles in the plurality of layers of magnetic nanoparticles are each directly anchored on a surface of a layer of the plurality of layers of the two-dimensional, layered material via the nucleation sites, and are each separated by multiple layers of the plurality of layers of the
(Continued)

two-dimensional, layered material. Methods of making and using the OHM porous materials are also provided.

13 Claims, 12 Drawing Sheets

(51) Int. Cl.

| | |
|---|---|
| *B01J 20/20* | (2006.01) |
| *B01J 20/26* | (2006.01) |
| *B01J 20/28* | (2006.01) |
| *B01J 20/32* | (2006.01) |
| *B82Y 30/00* | (2011.01) |
| *C01B 32/20* | (2017.01) |
| *C01B 32/22* | (2017.01) |
| *C02F 1/28* | (2023.01) |
| *C09K 3/32* | (2006.01) |
| *C10G 25/00* | (2006.01) |
| *C11B 13/04* | (2006.01) |
| *H01M 4/583* | (2010.01) |
| *H01M 4/66* | (2006.01) |
| *B82Y 40/00* | (2011.01) |
| *C02F 101/32* | (2006.01) |
| *C02F 103/00* | (2006.01) |
| *H01M 4/02* | (2006.01) |

(52) U.S. Cl.
 CPC ...... *B01J 20/28007* (2013.01); *B01J 20/28009* (2013.01); *B01J 20/32* (2013.01); *B01J 20/3212* (2013.01); *B01J 20/3236* (2013.01); *B01J 20/324* (2013.01); *B82Y 30/00* (2013.01); *C01B 32/20* (2017.08); *C02F 1/281* (2013.01); *C02F 1/283* (2013.01); *C02F 1/288* (2013.01); *C09K 3/32* (2013.01); *C10G 25/003* (2013.01); *C10G 25/006* (2013.01); *C11B 13/04* (2013.01); *H01M 4/583* (2013.01); *H01M 4/667* (2013.01); *B82Y 40/00* (2013.01); *C02F 2101/32* (2013.01); *C02F 2103/007* (2013.01); *C02F 2303/16* (2013.01); *C10G 2300/1003* (2013.01); *C10G 2300/1014* (2013.01); *H01M 2004/021* (2013.01)

(58) Field of Classification Search
 CPC ............ B01J 20/28007; B01J 20/28009; B01J 20/324
 USPC ....................................................... 428/408
 See application file for complete search history.

(56) References Cited

U.S. PATENT DOCUMENTS

| | | | |
|---|---|---|---|
| 2004/0108276 A1 | 6/2004 | Christodoulou | |
| 2009/0198076 A1 | 8/2009 | Guckel | |
| 2012/0018382 A1 | 1/2012 | Stein | |
| 2013/0284968 A1 | 10/2013 | Azizov et al. | |
| 2014/0183415 A1 | 7/2014 | Song | |
| 2015/0217222 A1 | 8/2015 | Hedin et al. | |
| 2016/0204416 A1 | 7/2016 | Wu et al. | |
| 2016/0243523 A1 | 8/2016 | Saini et al. | |
| 2017/0136062 A1 | 5/2017 | Alsharaeh et al. | |
| 2018/0208734 A1 | 7/2018 | Ozkan et al. | |
| 2018/0241032 A1 | 8/2018 | Pan et al. | |
| 2018/0370801 A1 | 12/2018 | Patole et al. | |
| 2019/0389744 A1* | 12/2019 | Biris ................ | B01J 20/3078 |
| 2021/0107792 A1 | 4/2021 | Nandwana et al. | |
| 2022/0059839 A1 | 2/2022 | Nandwana et al. | |
| 2023/0084588 A1 | 3/2023 | Ribet et al. | |

FOREIGN PATENT DOCUMENTS

| | | | | |
|---|---|---|---|---|
| KR | 10-2018-0037659 A | 4/2018 | | |
| WO | WO 2012/155196 A1 | 11/2012 | | |
| WO | WO 2013022051 | * 2/2013 | ............. | B82Y 10/00 |
| WO | WO 2017015648 | * 1/2017 | ........... | C01B 32/184 |
| WO | WO 2020/142261 | 7/2020 | | |

OTHER PUBLICATIONS

Bracamonte M. Victoria et al., "Lithium dual uptake anode materials: crystalline Fe3O4 nanoparticles supported over graphite for lithium-ion batteries," *Electrochimica Acta*, Elsevier, Amsterdam, NL, vol. 258, Oct. 7, 2017 (Oct. 7, 2017), pp. 192-199, XP085310877, ISSN: 0013-4686, DOI: 10.1016/J.Electacta.2017.10.034.

Xu Z. et al., "Dispersion of iron nano-particles on expanded graphite for the shielding of electromagnetic radiation," *Journal of Magnetism and Magnetic Materials*, Elsevier, Amsterdam, NL, vol. 322, No. 20, Oct. 1, 2010 (Oct. 1, 2010), pp. 3084-3087, XP027135542, ISSN: 0304-8853 [retrieved on May 25, 2010].

The extended European Search Report issued on Jan. 26, 2022 for EP Patent Application No. 19907115.0; pp. 1-13.

Hamed Hosseini Bay et al., "Scalable Multifunctional Ultra-Thin Graphite Sponge: Free-standing, Superporous, Superhydrophobic, Oleophilic Architecture with Ferromagnetic Properties for Environmental Cleaning," *Scientific Reports*, vol. 6, Feb. 24, 2016 (Feb. 24, 2016), pp. 1-9, XP055347982, DOI: 10.1038/srep21858.

Wen Qi et al., "Sandwich-structured nanocomposites of N-doped graphene and nearly monodisperse Fe3O4 nanoparticles as high-performance Li-ion battery anodes," *Nano Research* 2017, vol. 10, No. 9; pp. 2923-2933.

Lei Zhang et al., "Iron-Oxide-Based Advanced Anode Materials for Lithium-Ion Batteries," *Adv. Energy Mater.* 2014, vol. 4; pp. 1300958 (1 of 11).

Guangmin Zhou et al., "Graphene-Wrapped Fe3O4 Anode Material with Improved Reversible Capacity and Cyclic Stability for Lithium Ion Batteries," *Chem. Mater.* 2010, vol. 22; pp. 5306-5313. DOI:10.1021/cm101532x.

Taegyune Yoon et al., "Electrostatic Self-Assembly of Fe3O4 Nanoparticles on Graphene Oxides for High Capacity Lithium-Ion Battery Anodes," *Energies* 2013, vol. 6; pp. 4830-4840. DOI: 10.3390/en6094830.

Paul M. Winkler et al., "Heterogeneous Nucleation Experiments Bridging the Scale from Molecular Ion Clusters to Nanoparticles," *Science* Mar. 7, 2008, vol. 319; pp. 1374-1377.

Xiaoyang Pan et al., "Defect-Mediated Growth of Noble-Metal (Ag, Pt, and Pd) Nanoparticles on TiO2 with Oxygen Vacancies for Photocatalytic Redox Reactions under Visible Light," *The Journal of Physical Chemistry C* 2013, vol. 117; pp. 17996-18005. dx.doi.org/10.1021/jp4064802.

The International Search Report and the Written Opinion issued on Mar. 18, 2020 for International Patent Application No. PCT/US2019/067782; pp. 1-12.

Andrea C. Ferrari, "Raman Spectroscopy of graphene and graphite: Disorder, electron-phonon coupling, doping and nonadiabatic effects," *Solid State Communications*, vol. 143, Apr. 27, 2007 [retrieved on Feb. 5, 2020]. Retrieved from the Internet, URL: https://pubs.acs.org/doi/abs/10.1021/cm101532x. pp. 5306-5313.

D. Morillo et al., Poster—"Fe3O4 Nanoparticles-Loaded Cellulose Sponge: Novel system for the Arsenic removal from aqueous solution," TNT2009, Sep. 7-11, 2009, Barcelona-Spain; pp. 1-2.

Shanhu Liu et al., "Superhydrophobic/Superoleophilic magnetic polyurethane sponge for oil/water separationt," *RSC Adv.*, 2015, vol. 5; pp. 68293-68298.

Xuemei Zhang et al., "Preparation of Superhydrophobic Magnetic Polyurethane Sponge for Removing Oil Pollutants from Water," *IOP Conf. Series: Materials Science and Engineering*, 2018, vol. 392, 042003; pp. 1-7.

Viet-Ha Thi Tran et al., "Novel fabrication of a robust superhydrophobic PU@ZnO@ Fe3O4@SA sponge and its application in oil-water separations," *Scientific Reports*, vol. 7, 17520; pp. 1-12. DOI:10.1038/s41598-017-17761-9.

(56) References Cited

OTHER PUBLICATIONS

M. Anju et al., "Magnetically actuated graphene coated polyurethane foam as potential sorbent for oils and organics," *Arabian Journal of Chemistry* 2018; pp. 1-11. https://doi.org/10.1016/j.arabjc.2018.01.012.

Lei Wu et al., "Magnetic, Durable, and Superhydrophobic polyurethane@Fe3O4@SiO2@Fluoropolymer Sponges for Selective Oil Absorption and Oil/Water Separation," *ACS Appl. Mater. interfaces* 2015, vol. 7; pp. 4936-4946.

Huili Peng et al., "Preparation of Superhydrophobic Magnetic Cellulose Sponge for Removing Oil from Water," *Ind. Eng. Chem. Res.* 2016, vol. 55; pp. 832-838.

The International Search Report and Written Opinion issued in International Patent Application No. PCT/US18/46674 on Jan. 11, 2019, pp. 1-11.

Liu et al., "Iron Oxide Decorated MoS2 Nanosheets with Double PEGylation for Chelator-Free Radiolabeling and Multimodal Imaging Guided Photothermal Therapy," *ACS Nano* 2015, vol. 9, No. 1, pp. 950-960.

Nandwana et al., "One-Pot Green Synthesis of Fe3O4/ MoS2 0D/2D Nanocomposites and Their Application in Noninvasive Point-of-Care Glucose Diagnostics," *ACS Appl. Nano Mater.* 2018, vol. 1, pp. 194901958.

Peng et al., "Ultrathin Two-Dimensional MnO2/Graphene Hybrid Nanostructures for High-Performance, Flexible Planar Supercapacitors," *Nano Letters* 2013, vol. 13, pp. 2151-2157.

Peng et al., Supporting Information for "Ultrathin Two-Dimensional MnO2/Graphene Hybrid Nanostructures for High-Performance, Flexible Planar Supercapacitors," 2013, pp. 1-11.

Wang et al., "Biosensor Based on Ultrasmall MoS2 Nanoparticles for Electrochemical Detection of H2O2 Released by Cells at the Nanomolar Level," *Anal. Chem.* 2013, vol. 85, pp. 10289-10295.

Yu et al., "Smart MoS2/ Fe3O4 Nanotheranostic for Magnetically Targeted Photothermal Therapy Guided by Magnetic Resonance/Photoacoustic Imaging," *Theranostics* 2015, vol. 5, Issue 9, pp. 931-945.

Joensen et al., "Single-Layer MoS2," *Mat. Res. Bull.* 1986, vol. 21, pp. 457-461.

Zhu et al., "Fast Li Storage in MoS2-Graphene-Carbon Nanotube Nanocomposites: Advantageous Functional Integration of 0D, 1D, and 2D Nanostructures," *Adv. Energy Mater.* 2015, vol. 5, pp. 1401170-1401177.

V. Nicolosi et al., "Liquid Exfoliation of Layered Materials," *Science* Jun. 21, 2013, vol. 340, pp. 1226419-1-1226419-18.

D. Yang et al., "Li-Intercalation and Exfoliation of WS2," *J. Phys. Chem. Solids* 1996, vol. 57, No. 6-8, pp. 1113-1116.

Kufer et al., "Hybrid 2D-0D MoS2-PbS Quantum Dot Photodetectors," *Adv. Mater.* 2015, vol. 27, pp. 176-180.

Q. Qu et al., "2D Sandwich-like Sheets of Iron Oxide Grown on Graphene as High Energy Anode Material for Supercapacitors," *Adv. Mater.* 2011, vol. 23, pp. 5574-5580.

Jonathan N. Coleman, "Liquid Exfoliation of Defect-Free Graphene," *Accounts of Chemical Research* 2013, vol. 46, No. 1, pp. 14-22.

Ahmad et al., "Functionalized Molybdenum Disulfide Nanosheets for 0D-2D Hybrid Nanostructures: Photoinduced Charge Transfer and Enhanced Photo response," *J. Phys. Chem. Lett.* 2017, vol. 8, pp. 1729-1738.

Sandoval et al., "Raman study and lattice dynamics of single molecular layers of MoS2," *The American Physical Society Physical Review B* Aug. 15, 1991—II, vol. 44, No. 8, pp. 3955-3962.

Smith et al., "Large-Scale Exfoliation of Inorganic Layered Compounds in Aqueous Surfactant Solutions," *Adv. Mater.* 2011, vol. 23, pp. 3944-3948.

Chou et al., "Ligand Conjugation of Chemically Exfoliated MoS2," *J. Am. Chem. Soc.* 2013, vol. 135, pp. 4584-4587.

The International Search Report and the Written Opinion issued on Apr. 21, 2021 for International Patent Application No. PCT/US2021/019324; pp. 1-12.

Lei et al., "Simple fabrication of multi-functional melamine sponges," *Materials Letters*, vol. 190, Dec. 28, 2016 [retrieved on Mar. 28, 2021]. Retrieved from the Internet: ,URL: https://www.sciencedirect.com/science/article/abs/pil/S0167577X16319668>. pp. 119-122.

Calcagnile et al., "Magnetically Driven Floating Foams for the Removal of Oil Contaminants from Water," ACS Nano, vol. 6, No. 6, May 11, 2012 [retrieved on Mar. 28, 2021]. Retrieved from the Internet: URL: https//pubs.acs.org/doi/abs/10.1021/nn3012948. pp. 5413-5419.

Guan et al., "Superwetting Polymeric Three Dimensional (3D) Porous Materials for Ol/Water Separation: A Review," Polymers, vol. 11, No. 806, May 6, 2019 [retrieved on Mar. 28, 2021]. Retrieved from the Internet: URL: https://www.mdpi.com/2073-4360/11/5/806.. pp. 1-34.

Zeeshan Ajmal et al., "Phosphate removal from aqueous solution using iron oxides: Adsorption, desorption and regeneration characteristics," *Journal of Colloid and Interface Science* May 2018, vol. 528; pp. 145-155.

Dema A. Almasri et al., Adsorption of phosphate on iron oxide doped halloysite nanotubes, *Scientific Reports* 2019, vol. 9, 3232; pp. 1-13. https://doi.org/10.1038/s41598-019-39035-2.

Jiang, D., Amano, Y. & Machida, M. Removal and Recovery of Phosphate from Water by a Magnetic Fe3O4@ASC Adsorbent. *Journal of Environmental Chemical Engineering* 5, 4229-4238 (2017).

Yoon, S. Y. et al. Kinetic, Equilibrium and Thermodynamic Studies for Phosphate Adsorption to Magnetic Iron Oxide Nanoparticles. *Chemical Engineering Journal* 236, 341-347 (2014).

Choi, J., Chung, J., Lee, W. & Kim, J. O. Phosphorous Adsorption on Synthesized Magnetite in Wastewater. *Journal of Industrial and Engineering Chemistry* 34, 198-203 (2016).

Zach-Maor, A., Semiat, R. & Shemer, H. Synthesis, Performance, and Modeling of Immobilized Nano-Sized Magnetite Layer for Phosphate Removal. *Journal of Colloid and Interface Science* 357, 440-446 (2011).

Jung, K. W. & Ahn, K. H. Fabrication of Porosity-Enhanced MgO/biochar for Removal of Phosphate from Aqueous Solution: Application of a Novel Combined Electrochemical Modification Method. *Bioresource Technology* 200, 1029-1032 (2016).

Examination Report issued on Jan. 17, 2023 for Indian Patent Application No. 202137033787; pp. 1-6.

The International Search Report and Written Opinion issued on Mar. 11, 2020 for international patent application No. PCT/US19/67839; pp. 1-7.

* cited by examiner

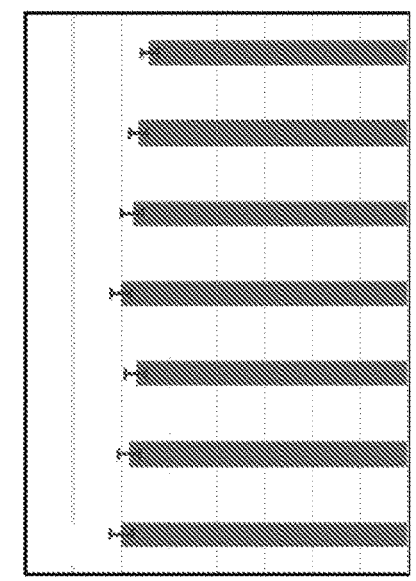
FIG. 6A
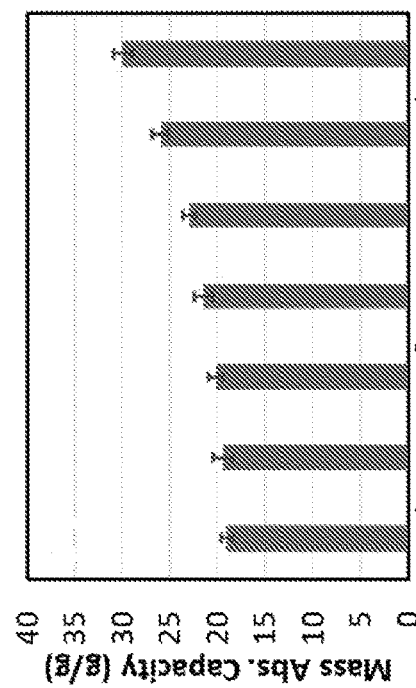
FIG. 6B
FIG. 6C
FIG. 6D

OLEOPHILIC HYDROPHOBIC MAGNETIC POROUS MATERIALS

CROSS-REFERENCE TO RELATED APPLICATIONS

The present application is a National Stage of International Application No. PCT/US19/67839, filed Dec. 20, 2019, which claims priority to U.S. provisional patent application No. 62/788,321 that was filed Jan. 4, 2019, and U.S. provisional patent application No. 62/788,347 that was filed Jan. 4, 2019, the entire contents of both of which are incorporated herein by reference.

REFERENCE TO GOVERNMENT RIGHTS

This invention was made with government support under grant number 1507810 awarded by the National Science Foundation. The government has certain rights in the invention.

BACKGROUND

Oil spills are a worldwide problem that cause great damage to the environment, especially marine life. Oil removal is an expensive and complicated process. There are three main approaches used for cleaning oil spills. The first involves the use of dispersants. Dispersants help emulsify the oil into surrounding water but these compounds don't actually remove oil from the water. The second involves the use of booms and skimmers. In this approach, oil is contained by the booms and then collected via pumps. The third is in situ burning which involves igniting the oil as it is floating on water. Each of these approaches suffers from a number of disadvantages. In situ burning increases carbon emission while dispersants have been found to be harmful to marine wildlife. Skimmers are inefficient since they collect water along with oil, thus requiring additional work to separate water from oil. In some cases, the oil cannot be recovered. All of the approaches are expensive and none of them can be reused.

SUMMARY

Provided are oleophilic-hydrophobic-magnetic (OHM) porous materials which are formed from a porous substrate that has been coated with a nanocomposite. Also provided are methods of making and using the OHM porous materials, including methods of recovering oil from oil-water mixtures.

In embodiments, an oleophilic-hydrophobic-magnetic (OHM) porous material is provided which comprises a porous substrate having a solid matrix defining a plurality of pores distributed through the solid matrix, the OHM porous material further comprising a coating of a nanocomposite on surfaces of the solid matrix. The nanocomposite comprises a multilayer stack of a plurality of layers of a two-dimensional, layered material having nucleation sites interleaved between a plurality of layers of magnetic nanoparticles, wherein individual layers of magnetic nanoparticles in the plurality of layers of magnetic nanoparticles are each directly anchored on a surface of a layer of the plurality of layers of the two-dimensional, layered material via the nucleation sites, and are each separated by multiple layers of the plurality of layers of the two-dimensional, layered material.

Methods of making and using the OHM porous materials are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1B also shows that the nanocomposite may be provided as a formulation with water or an aqueous solution.

FIGS. 6A-6D show the oil absorption capacity of an illustrative OHM sponge used to recover various types of oil (FIG. 6A), as a function of repeated use (FIG. 6B), at various pH conditions (FIG. 6C), and at salt concentrations up to 1M (FIG. 6D).

DETAILED DESCRIPTION

Provided are oleophilic-hydrophobic-magnetic (OHM) porous materials which are formed from a porous substrate that has been coated with a nanocomposite. Also provided are methods of making and using the OHM porous materials, including methods of recovering oil from oil-water mixtures.

Figure 1A:
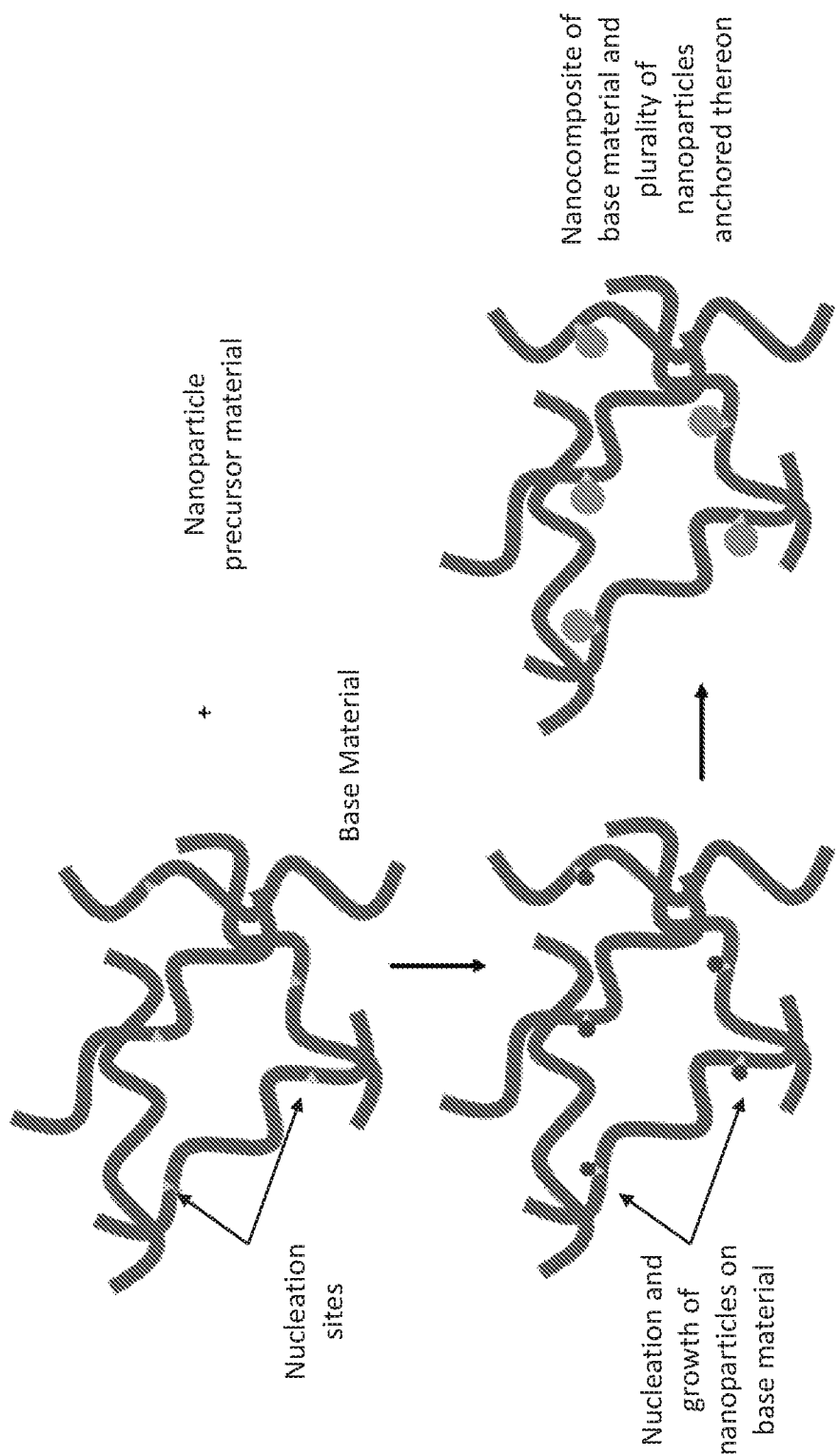
FIG. 1A depicts a schematic of heterogeneous nucleation events associated with formation of an illustrative nanocomposite of a base material and a plurality of nanoparticles.

The nanocomposites used to coat the porous substrate comprise a base material and a plurality of nanoparticles anchored onto a surface of the base material. The unique method of making the nanocomposites (further described below) facilitates heterogeneous nucleation of the nanoparticles from a nanoparticle precursor material directly at nucleation sites on a surface of the base material. These nucleation sites may be defect sites present in the base material or, in embodiments, sites which are synthesized by chemical modification or functionalization of the surface of the base material. This heterogeneous nucleation enables nanoparticles to be directly anchored onto the surface of the base material via an associated nucleation site. Without wishing to be bound to any particular theory, it is also believed that this type of growth mechanism involves electron transfer between the base material and the nanoparticles, thereby achieving intimate association between the nanoparticles and base material and improved properties of the base material. In addition, this growth mechanism distinguishes the resulting nanocomposites from physical mixtures of a base material and a plurality of nanoparticles. FIG. 1A depicts a schematic of heterogeneous nucleation events associated with formation of an illustrative nanocomposite of a base material and a plurality of nanoparticles.

The base material is generally a two-dimensional, layered material (i.e., a plurality of two-dimensional sheets layered and bound together, e.g., via van der Waals forces). In such embodiments, the nanocomposite comprises a multilayer stack of a plurality of layers of the two-dimensional, layered material interleaved between a plurality of layers of nanoparticles, wherein individual layers of nanoparticles in the plurality of layers of nanoparticles are each directly anchored on a surface of a layer of the plurality of layers of the two-dimensional, layered material via nucleation sites, and are each separated by multiple layers of the plurality of layers of the two-dimensional, layered material.

Figure 1B:
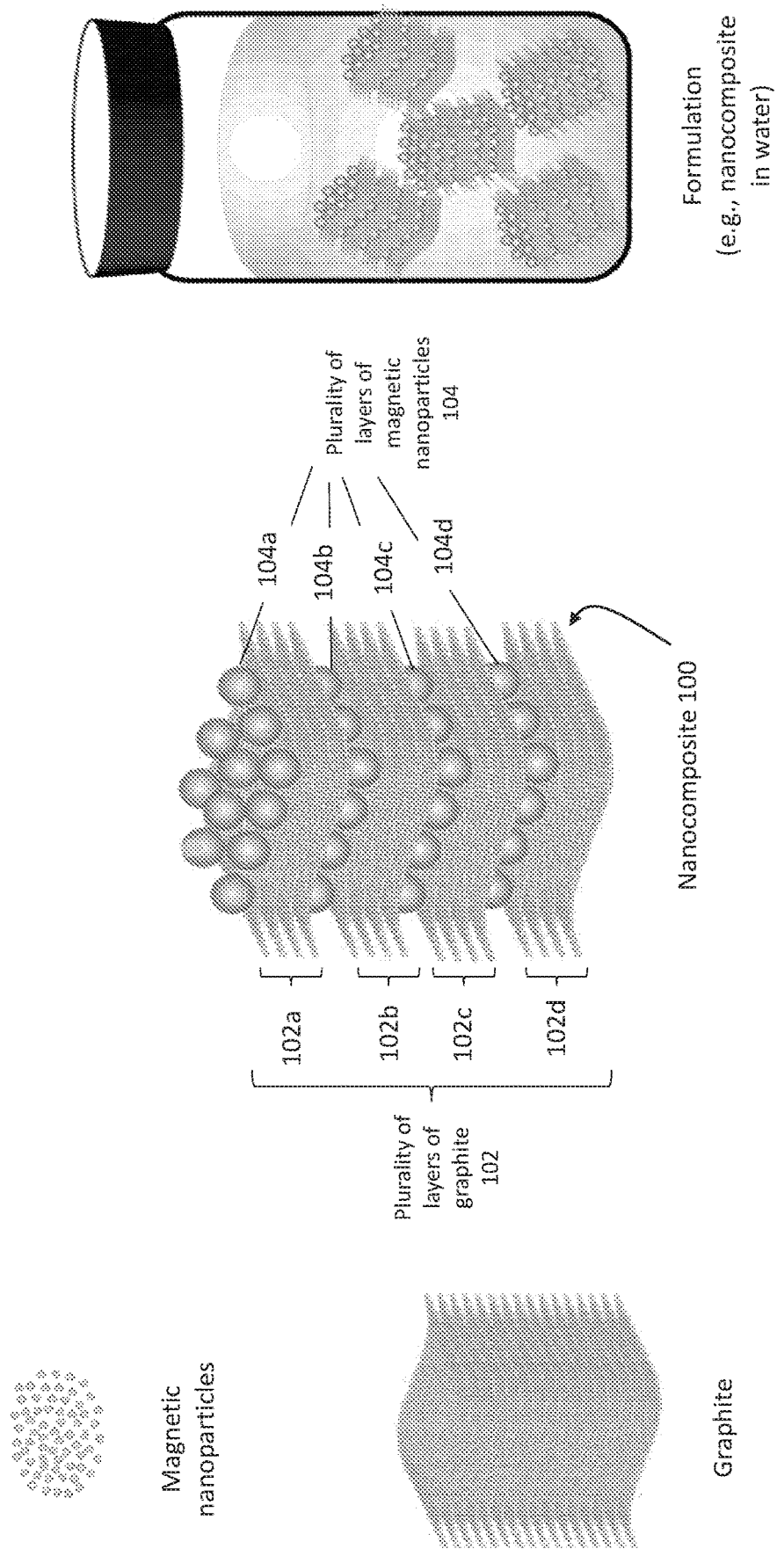
FIG. 1B depicts a schematic of an illustrative nanocomposite of a base material (e.g., graphite) and a plurality of nanoparticles (e.g., $Fe_3O_4$ nanoparticles) which may be used to form a nanocomposite coating on a porous substrate. The nanocomposite is in the form of a multilayer stack of a plurality layers of graphite interleaved between a plurality of layers of nanoparticles. Individual layers of nanoparticles are each anchored on a surface of a layer (i.e., a layer of graphene) of the plurality of layers of graphite, and are each separated by multiple layers (i.e., multiple layers of graphene) of the plurality of layers of graphite. The nanocomposite is free of isolated graphene; that is, each layer of graphene is in contact with one or more other layers of graphene, as is the case in unmodified graphite. As such, the nanocomposite has a layered morphology similar to that of unmodified graphite. However, as demonstrated in the Example, below, the nanocomposite has greatly improved properties as compared to unmodified graphite.

Such a nanocomposite is illustrated in FIG. 1B, showing a nanocomposite 100 comprising graphite as the two-dimensional, layered base material. In the nanocomposite 100, the plurality of layers 102 of graphite includes multiple layers 102a-d of graphene (an individual layer of graphite is a graphene layer). The plurality of layers 104 of nanoparticles includes individual layers 104a-d of nanoparticles. The multiple layers 102a-d and the individual layers 104a-d are interleaved with one another to form the larger stack which constitutes the nanocomposite. Although the nanocomposite 100 of FIG. 1B shows four layers of nanoparticles, each layer separating a grouping(s) of four layers of graphene, other nanocomposites may have groupings having different numbers of layers of graphene and may have different numbers of layers of the nanoparticles. Individual layers of nanoparticles may be separated by a few (e.g., 2-6) layers of graphene, to several (e.g., 7-11) layers of graphene, or more. A set of a few layers of graphene may be referred to as a layer of graphite; similarly, a set of several layers of graphene may also be referred to as a layer of graphite.

Figure 4A:
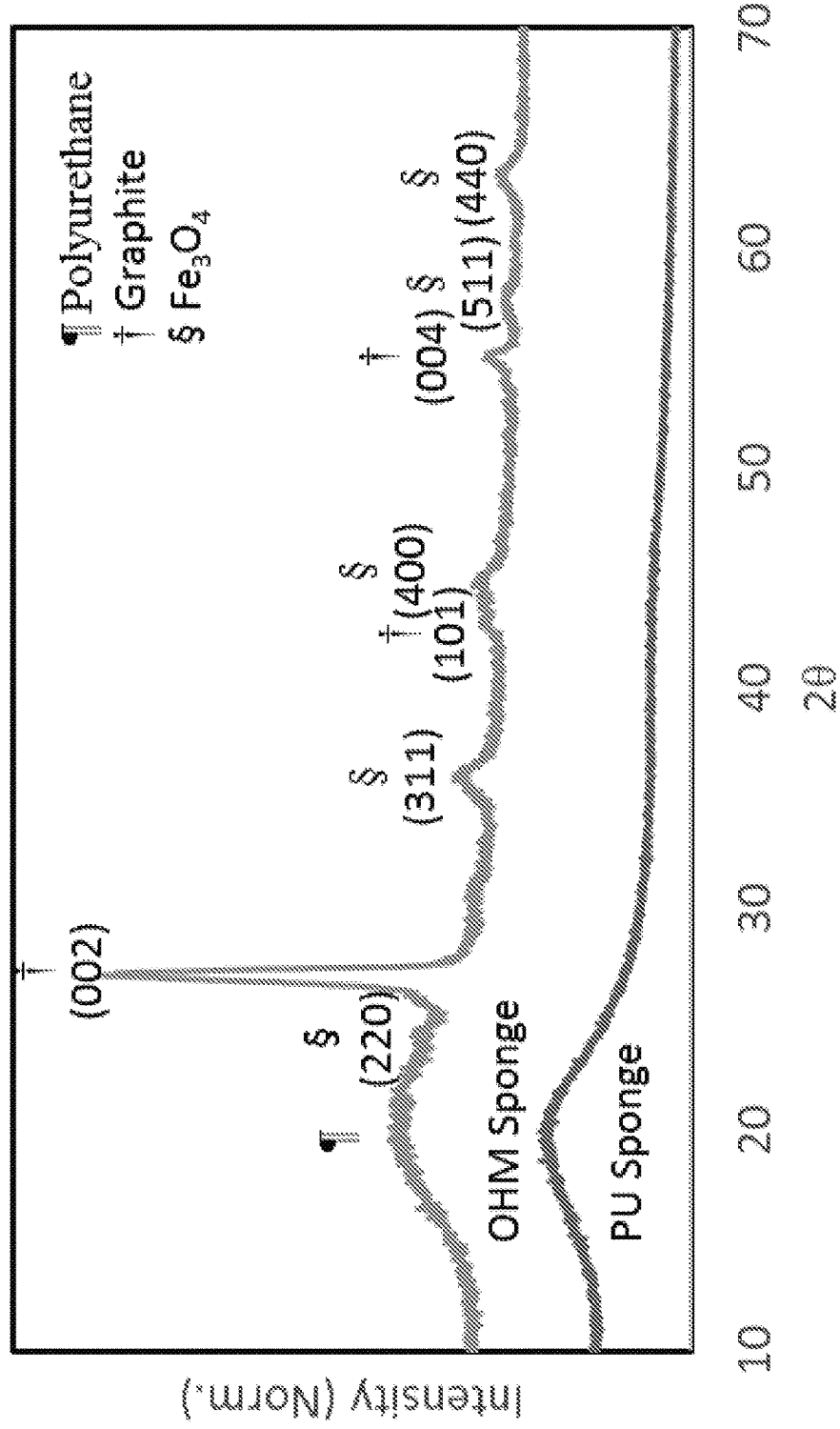
FIG. 4A shows X-ray diffraction (XRD) spectra of an uncoated PU sponge (bottom) and a PU sponge (top) coated with the graphite/$Fe_3O_4$ nanocomposite formed via a method similar to that shown in FIG. 2. Peaks characteristic of PU, graphite, and $Fe_3O_4$ are present for the coated PU sponge, while only PU peaks are present in the uncoated PU sponge. In addition, the large (002) peak at $2\Theta=24-28°$ confirms that the nanocomposite coated on the PU sponge contains graphite and is free of isolated graphene. Regarding the nanocomposite.
Figure 4B:
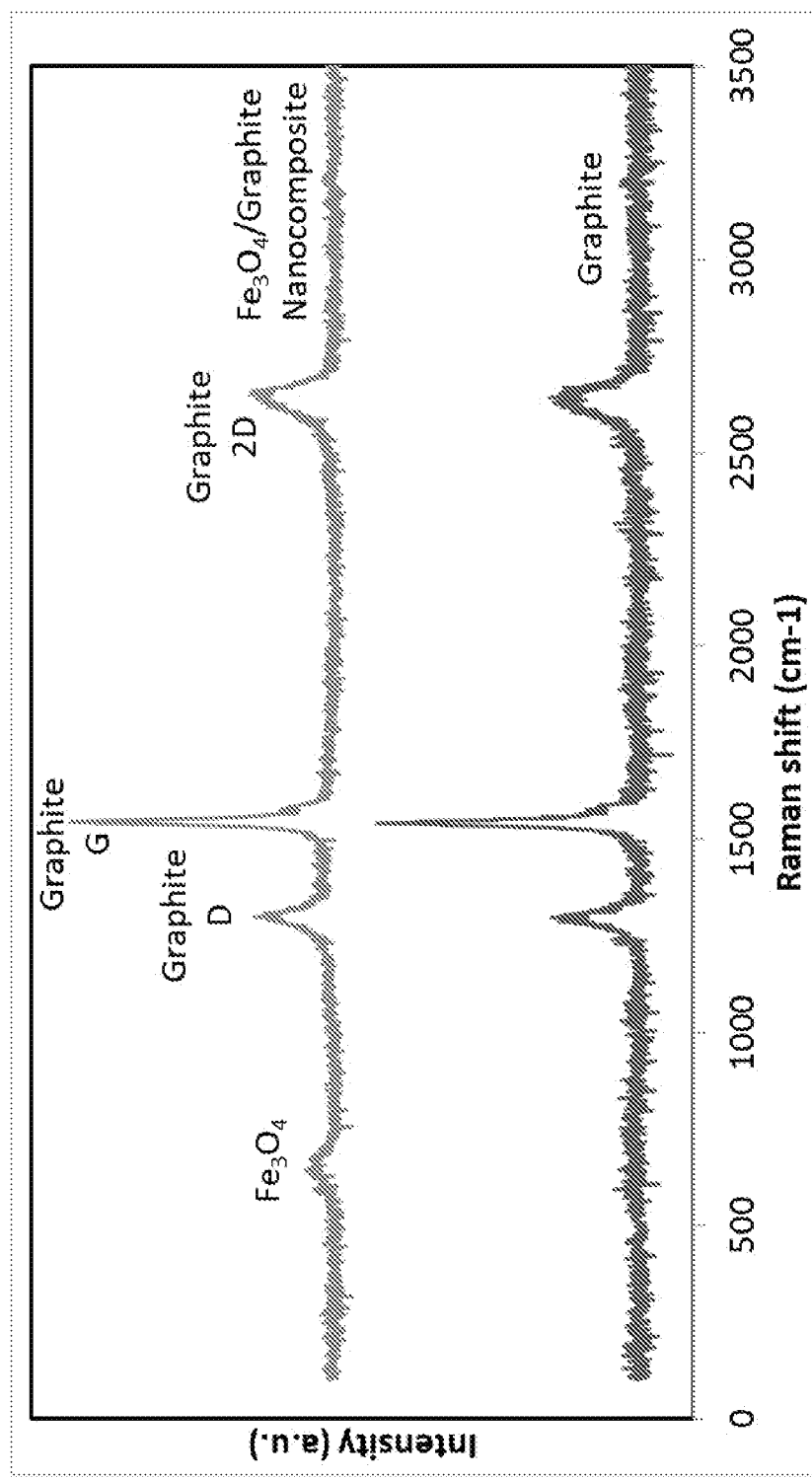
FIG. 4B shows Raman spectra of graphite (bottom) and the nanocomposite used in FIG. 4A (top). The nanocomposite has the same characteristic peaks associated with graphite, including the larger G peak as compared to the 2D peak and an additional shoulder present on the 2D peak.

Within the stack, there is direct contact between neighboring layers (i.e., between nanoparticles of a layer of nanoparticles and an adjacent layer of graphene and between adjacent layers of graphene). These layers are held together via van der Waals forces to form the larger stack. As such, the nanocomposite has a layered morphology similar to that of unmodified graphite. Thus, the nanocomposite may be distinguished from composite materials composed of graphene (a single layer) flakes decorated with nanoparticles. Confirmation that the present graphite nanocomposites have the layered, graphite morphology and are free of isolated graphene may be achieved using X-ray diffraction (XRD) measurements. For example, FIG. 4A shows XRD spectra of a nanocomposite (top) formed using a method similar to that shown in FIG. 2 (see "method 3" described in the Example, below). The nanocomposite is composed of graphite as the base material and a plurality of $Fe_3O_4$ nanoparticles. The inset marks the characteristic peaks associated with graphite (cross) and with $Fe_3O_4$ nanoparticles (§). The large (002) peak at $2\Theta=24-28°$ confirms that the nanocomposite contains graphite and is free of isolated graphene. By contrast, a nanocomposite containing graphene would have at most a minor bump and no distinct peak at this range. Additional confirmation that the present graphite nanocomposites have the layered, graphite morphology and are free of isolated graphene may be achieved using Raman spectroscopy. For example, FIG. 4B shows the Raman spectra of pristine graphite (bottom) and the same nanocomposite of FIG. 4A. The spectrum of the nanocomposite shows the characteristic peaks of graphite, i.e., the G peak at $1540$ $cm^{-1}$ that is higher than the 2D peak and the presence of an additional shoulder in the 2D peak of graphite. By contrast, a nanocomposite containing graphene would have its 2D peak signficantly higher than the G peak and there would be no shoulder in the 2D peak.By "free" it is meant that the amount of isolated graphene is zero or small enough not to materially affect the properties of the nanocomposite (e.g., the oil-absorbing capacity of a sponge coated with the nanocomposite). For other two-dimensional, layered materials, similar confirmation may be carried out to confirm that the nanocomposite is free of isolated layers of the two-dimensional, layered material.

Other two-dimensional, layered materials may be used as the base material besides graphite. Illustrative such base materials include transition metal dichalcogenides, e.g., $MX_2$, wherein M is Mo or W and X is S, Se or Te.

Other carbon-based materials may be used as the base material for the nanocomposite, e.g., carbon black, carbon nanotubes, carbon onions, carbon dots, fullerenes, nanodiamond, diamond, and carbynes. Other base materials include paraffin wax, manganese oxide, polystyrene, zinc oxide, silica, fluorinated silanes, and polymers such as fluoropolymer. The base material may have a one-dimensional morphology (e.g., carbon nanotubes) or have a zero-dimensional morphology (e.g., nanoparticle or microparticle).

Combinations of different base materials may be used in the nanocomposite.

Regarding the nanoparticles in the nanocomposite, the nanoparticles are generally magnetic nanoparticles. Hard magnetic materials may be used, e.g., CoCrPt, Co, $Co_3Pt$, FePd, FePt, CoPt, CoPd, FeCo, MnAl, $Fe_{14}Nd_2B$, $SmCo_5$. Soft magnetic materials may be used, e.g., $Fe_3O_4$, $MnFe_2O_4$, $NiFe_2O_4$, $MgFe_2O_4$. Other soft magnetic materials include the following soft magnetic ferrite compounds having the formula $M'_xM''_{1-x}Fe_2O_4$, wherein M' and M" are different and are independently selected from Co, Ni, Zn, Ba, Sr, Mg, Mn and $0 \leq x \leq 1$. In some such embodiments, $0.1 \leq x \leq 0.9$. Other soft magnetic materials include Fe—Si alloy, Ni—Fe alloy, and nano-crystalline alloy of Fe, Ni and/or Co with B, C, P, or Si.

Within an individual layer of nanoparticles, the nanoparticles may be distributed uniformly (by which it is meant that the nanoparticles are separated by approximately equal distances) across the surfaces of the adjacent material (i.e., the layers of the two-dimensional, layered base material) with which they are in contact. In addition, the individual layers of nanoparticles may be free from aggregated nanoparticles. By "free" it is meant that the amount of aggregates is zero or small enough not to materially affect the properties of the nanocomposite (e.g., the oil-absorbing capacity of a sponge coated with the nanocomposite).

Nanoparticles having a variety of different sizes and shapes may be used. Thus, the term "nanoparticles" or "nanocomposite" is not meant to be limiting to a particular size. In embodiments, the nanoparticles may have each of their three dimensions on the order of 1000 nm or less. The nanoparticles may be spherical, but this term encompasses irregularly shaped particles which are still reasonably well defined three dimensions which are of similar magnitude. The nanoparticles may be characterized by an average diameter. The average diameter may be 500 nm or less, 200 nm or less, 100 nm or less, 50 nm or less, 25 nm or less, 10 nm or less, 5 nm, or in the range of from 1 nm to 100 nm. The magnetic nanoparticles may have an average diameter that is sufficiently small so the magnetic nanoparticles exhibit superparamagnetic behavior at room temperature (20 to 25° C.). The specific average diameter will depend upon the magnetic material used, but for $Fe_3O_4$ nanoparticles, the superparamagnetic size limit is about 15 nm.

The intimate association of the base material and the nanoparticles described above may be accomplished without any functionalization (i.e., covalently bound functional groups) of either the base material or the nanoparticles. That is, in embodiments, the base material, the nanoparticles, and thus, the nanocomposite are unfunctionalized. However, in embodiments, the nanoparticles are functionalized. The nanoparticles can be functionalized with one or more moieties during/after nanocomposite formation or during/after nanocomposite coating on porous substrates. The functional moieties can be oleophilic, superoleophilic, hydrophobic, or superhydrophobic or their combination to improve oleophilicity and/or hydrophobicity of the OHM porous material. The functional moieties can also be chosen to bind other pollutants in water such as heavy metals, bacteria, and microplastics, volatile organic compounds (VOCs), organic pollutants, pesticides, etc.

The nanocomposite may include various relative amounts of the base material component and the nanoparticles component, depending upon the desired properties for the OHM porous material and the desired application. In embodiments, the loading of the nanoparticles in the nanocomposite is in the range of from 10 weight % to 90 weight %. Here, "weight %" is (weight of the nanoparticles)/(total weight of the nanocomposite)*100. This includes a range of from 20 weight % to 80 weight %, from 30 weight % to 70 weight %, from 40 weight % to 60 weight %, etc.

A variety of porous substrates may be used to form the OHM porous materials. The porous substrate may be composed of natural or synthetic materials; be woven or nonwoven; and may assume a variety of forms (e.g., two-dimensional forms such as membranes, sheets, strips, etc. or three-dimensional forms such as pads, balls, blocks, etc.) The porous substrates may be referred to as sponges, foams, filters, etc. The porous substrates may be described as a solid matrix in the form of network of interconnected strands which extend (e.g., randomly, although regularly oriented strands such as those in woven textiles may be used) in three-dimensions to define a plurality of pores and elongated, tortuous channels distributed throughout the solid matrix. As noted above, this solid matrix may be composed of a variety of natural or synthetic materials (including combinations thereof). Illustrative materials for the solid matrix include polyurethane, cellulose, melamine, polyimide, acrylic, polyamide, polyester, polycarbonate, and polyaramide. The "surfaces" of the solid matrix may refer to external surfaces (those facing away from the body of the solid matrix) as well as internal surfaces (those facing towards the interior of the body of the solid matrix). The size and shape of the pores/channels of the solid matrix, as well as its porosity, are not particularly limited. Rather these parameters may be tuned as desired, e.g., to provide a particular absorbency for a particular type of oil, particular mechanical properties (e.g., rigidity/flexibility) for a particular type of application, etc. The overall size and shape of the solid matrix is also not particularly limited, but depends upon the application.

As noted above, the porous substrates are coated with any of the nanocomposites described above to form the OHM porous materials. Various loadings of the nanocomposite onto the solid matrix of the porous substrate may be used. In embodiments, the loading of the nanocomposite in the OHM porous material is in the range of from 1 weight % to 20 weight %. Here, "weight %" is (weight of the nanocomposite)/(total weight of the OHM porous material)*100. This includes a range of from 1 weight % to 18 weight %, from 5 weight % to 15 weight %, from 12 weight % to 14 weight %, etc. The loading may also be tuned to provide a certain surface coverage of the nanocomposite on the surfaces of the solid matrix (e.g., to provide a continuous coating) as well as to provide a nanocomposite coating having a desired thickness. In embodiments, the nanocomposite coating has an average thickness in the range of from 300 nm to 3 µm, from 10 µm to 100 µm, from 20 µm to 75 µm, or from 30 µm to 50 µm. However, in embodiments, the average thickness is less than 10 µm, e.g., in a range of from 1 µm to 10 µm.

The nanocomposite coating imparts oleophilic, hydrophobic, and magnetic properties to the OHM porous materials. Regarding oleophilicity, this property may be quantified by measuring a contact angle for a droplet of oil deposited on a surface of the OHM porous material. (See FIG. 5B.) The contact angle may be measured as described in the Example below. In embodiments, the contact angle for a droplet of oil deposited on a surface of the OHM porous material is no more than 20°, no more than 15°, no more than 10°, no more than 5°, or about zero. Similarly, hydrophobicity may be quantified by measuring a contact angle for a droplet of water (e.g., pure water) deposited on a surface of the OHM porous material. (See FIG. 5A.) In embodiments, the contact angle for a droplet of water deposited on a surface of the OHM porous material is at least 120°, at least 122°, at least 125°, at least 130°, at least 135°, or at least 140°. Confirmation of the magnetic nature of the OHM porous material may be obtained by assessing the response of the OHM porous material to a magnet, e.g., a permanent magnet (Br=200-2000 mT). An electromagnet may also be used. Confirmation of the magnetic nature may be carried out by exposing an OHM porous material to a magnetic field as low as 200 mT and confirming that the magnetic field induces motion of the OHM porous material.

Figure 3:
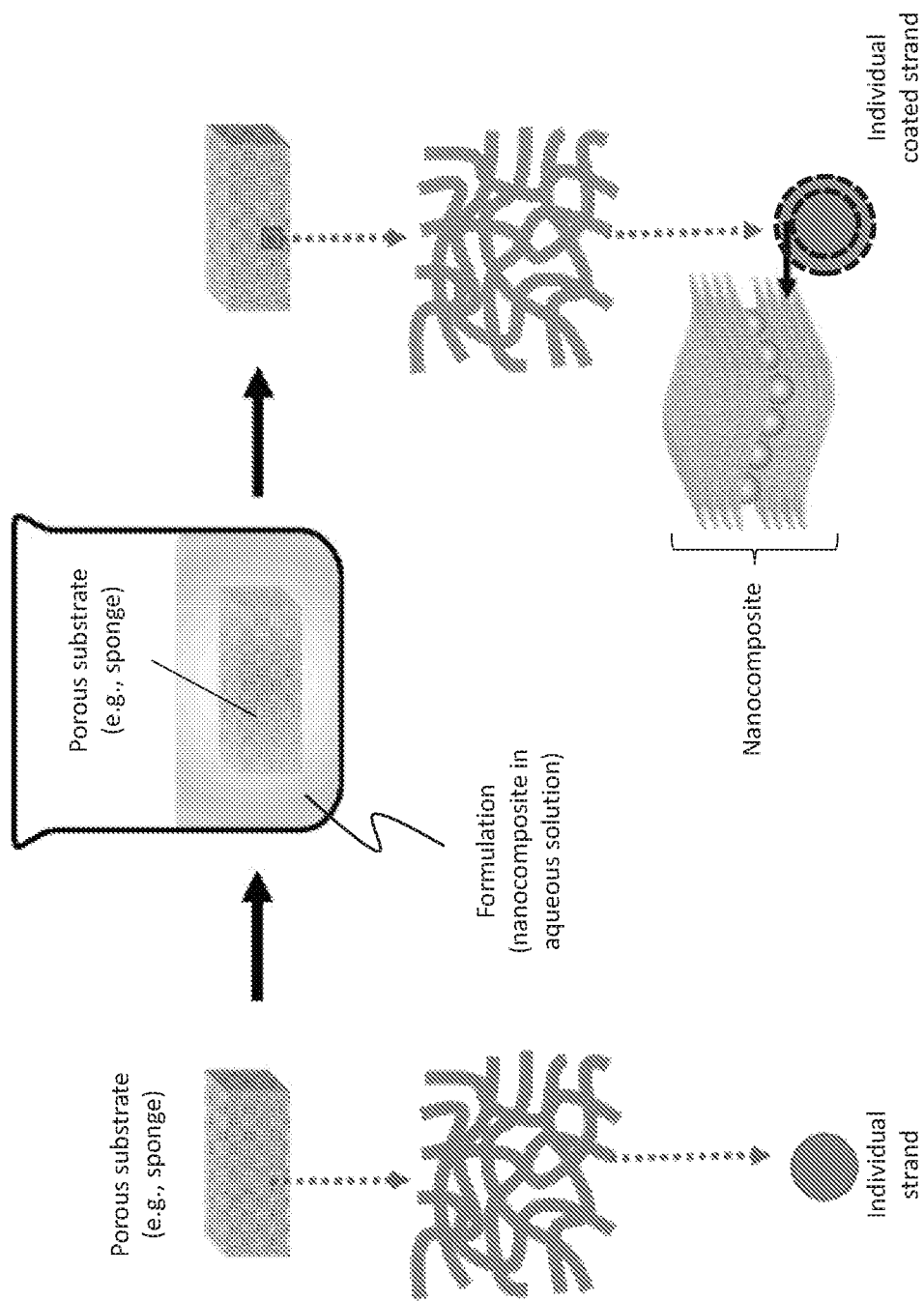
FIG. 3 depicts a schematic of an illustrative method of making an oleophilic-hydrophobic-magnetic (OHM) porous material from a porous substrate (e.g., a polyurethane (PU) sponge) and a nanocomposite (e.g., a graphite/$Fe_3O_4$ nanocomposite).

Methods of making the OHM porous materials are also provided. In embodiments, such a method comprises immersing any of the disclosed porous substrates in a formulation comprising any of the disclosed nanocomposites for a period of time to form a coating of the nanocomposite on surfaces of the solid matrix of the porous substrate. Immersion may be accompanied by mixing the formulation, including by sonication. Immersion may be carried out at room temperature (20 to 25° C.). However, in embodiments, higher temperatures may be used. The coated solid matrix may then be heated at an elevated temperature (i.e., greater than room temperature) for a period of time to provide the OHM porous material. Illustrative conditions and additional details are provided in the Example below. An illustrative method of making an OHM porous material using a commercially available sponge as the porous substrate is depicted in FIG. 3.

Methods of making the nanocomposites are also provided. In embodiments, such a method comprises combining a first input stream of flowing fluid (i.e., gas or liquid or both) comprising a base material, a second input stream of flowing fluid comprising a nanoparticle precursor material, and a third input stream of flowing fluid comprising a nanoparticle nucleation agent, to form an output stream of flowing fluid. In embodiments, the fluid is a liquid. The input streams need not be continuous in nature, e.g., discrete or repeated injections of the respective materials/agents may be used.

Next, the output stream is heated or sonicated or both for a period of time. The result of this step is nucleation and growth of a plurality of nanoparticles on a surface of the base material from the nanoparticle precursor material and the nucleation agent. That is, nanoparticle nucleation and growth, induced by the nucleation agent, occurs on the surface of the base material to provide a nanoparticle directly anchored thereon. The nanoparticles essentially become a part of, or embedded within, the base material. This is different than nanoparticles adsorbed onto a surface of a substrate or covalently bound via a functional group. In embodiments in which the base material is a two-dimensional, layered material such as graphite, this step also achieves or maintains exfoliation (separation) of the base material into sub-stacks of multiple layers of the two-dimensional, layered material as well as nucleation and growth of nanoparticles on those sub-stacks. In embodiments in which the base material is a two-dimensional, layered material such as graphite, the base material may be pre-exfoliated, e.g., by being sonicated prior to being combined to form the output stream (i.e., pre-sonicated).

Next, a nanocomposite formed within the fluid of the output stream is collected. This may comprise collecting the output stream and subjecting it to a processing step(s) to recover the nanocomposite. In some embodiments, precipitation of the nanocomposite within the liquid of the output stream may be induced. Precipitation may be induced by stopping the sonication for another period of time. The flow rate of the output stream may also be decreased or stopped. Precipitation may be induced by collecting the output stream, e.g., into a container in the absence of sonication so the precipitate may settle out of the liquid. In embodiments in which the base material is the two-dimensional, layered material, precipitation also achieves self-assembly of the sub-stacks to form the larger stack constitutes the nanocomposite as described above.

The use/type of sonication, the periods of time, and the flow rate may be adjusted to facilitate formation of nanoparticles and nanocomposites having the characteristics described above. Illustrative conditions are described in the Example, below (see "method 3"). The flowing liquid may be water or an aqueous solution. However, organic solvents may also be used. The method may be carried out at room temperature, although in embodiments, higher temperatures may be used. The Example also shows how other methods do not necessarily achieve nanocomposites having all the characteristics described above (see "method 1" and "method 2").

Figure 2:
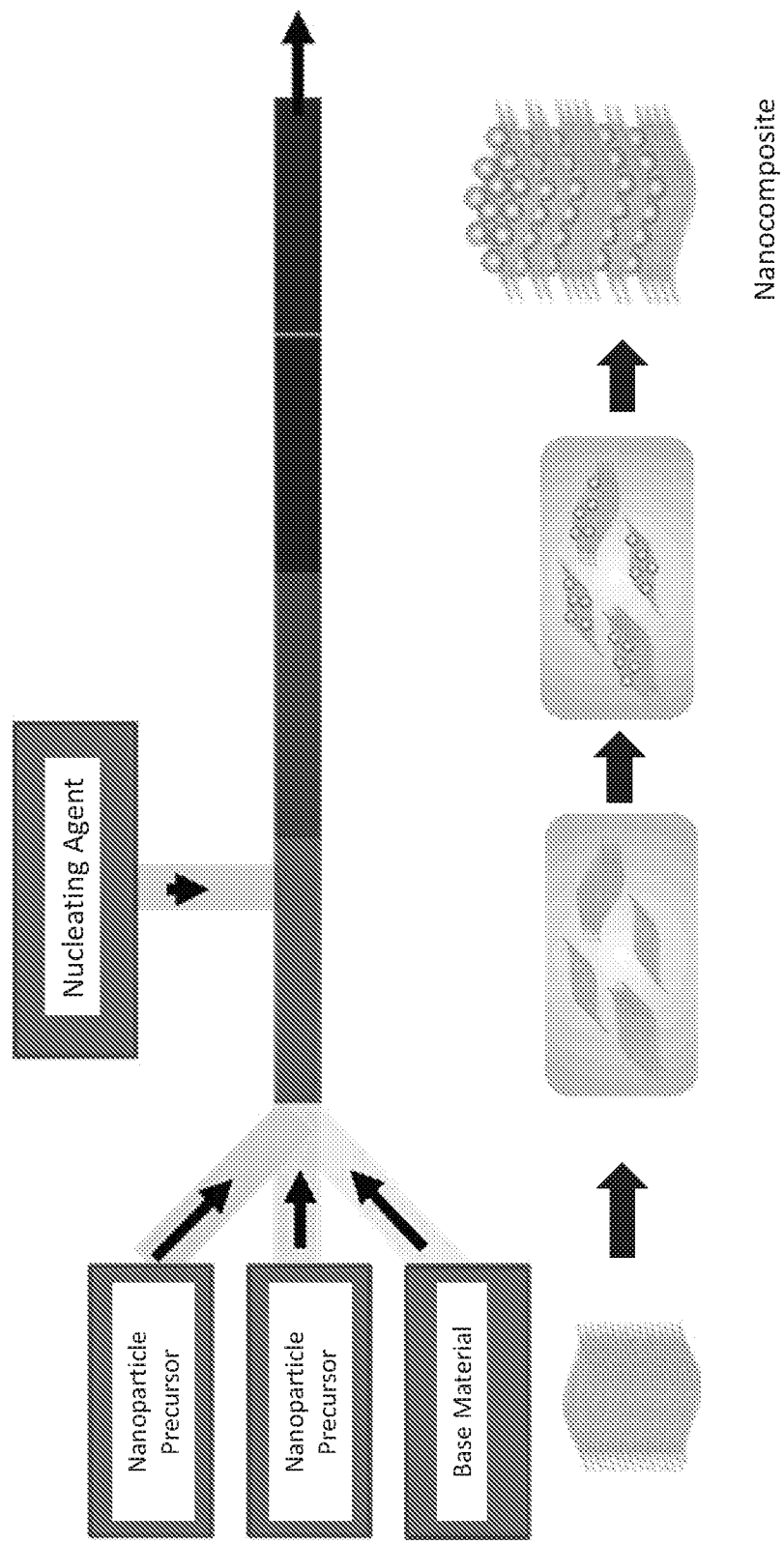
FIG. 2 depicts a schematic of an illustrative method of making a nanocomposite, such as the nanocomposite shown in FIG. 1B, which may be used to form a nanocomposite coating on a porous substrate.

A flow reactor may be used to carry out the method described above. An embodiment of such a flow reactor is shown in FIG. 2. In this embodiment, there are two nanoparticle precursor material input streams and the nucleating agent is a separate input stream added downstream of the other input streams. Various numbers of input streams and various orders of combining them may be used (provided they are combined into the single output stream). Other types of input streams may include input streams comprising other additives (e.g., reducing agents, surfactants), other solvents, etc.

The specific nanoparticle precursor materials and nucleating agents depends upon the choice of the desired nanocomposite. For transition metal-containing magnetic nanoparticles, transition metal salts may be used as the nanoparticle precursor materials. In embodiments, the nucleation agent may be an oxidizing agent (e.g., a base such as NaOH). As shown in FIG. 2, for two-dimensional, layered materials such as graphite, exfoliation of the graphite to sub-stacks, nanoparticle nucleation and formation on the sub-stacks, and restacking of decorated sub-stacks to form the larger stack occurs, in situ, within the flowing liquid of the output stream.

In embodiments in which there is the nanocomposite precipitates, the precipitate may be separated, washed and dried prior to use. Thus, in embodiments the nanocomposite is in the form of a powder. However, as described above, the nanocomposite may be provided as a formulation comprising water or an aqueous solution. That formulation may be used in the immersion step to form the coating on the solid matrix of the porous substrate.

The OHM porous materials may be used in a variety of applications. However, the OHM porous materials are particularly useful in recovering hydrophobic materials, e.g., oil from a mixture comprising water and a hydrophobic material. In embodiments, such a method comprises contacting any of the disclosed OHM porous materials with a mixture comprising water and a hydrophobic material for a period of time to absorb the hydrophobic material from the mixture. Absorption of the hydrophobic material from the mixture by the OHM porous material results in a hydrophobic material-containing OHM porous material and reduces the content of the hydrophobic material in the mixture. As further described below, "reducing" can include reducing the content of the hydrophobic material in the mixture to zero (or so close to zero that any small amount of the hydrophobic material remaining does not materially affect the properties of the water).

The mixture from which the hydrophobic material is to be recovered may include various relative amounts of the hydrophobic material and the water. The mixture may be an emulsion comprising either relatively small amounts of the hydrophobic component as compared to water or relatively small amounts of water as compared to the hydrophobic component. Hydrophobic materials include oils such as crude oil, diesel, gasoline, paraffin oil, motor oil, pump oil, lubricating oil, kerosene, petroleum ether, vegetable oils (e.g., soybean oil, sunflower oil, etc.), fatty oils (also fatty acids and alcohols), etc. Hydrophobic materials also include smaller organic molecules which are insoluble and/or immiscible with water such as chloroform, toluene, hexane, octane, decane, dodecane, phenixin, benzene, chlorobenzene, nitrobenzene, dichloromethane, etc. The hydrophobic materials may be present on a surface of the water or below the surface of the water. A variety of other components may be present in the mixture, depending upon its source. As shown in the Example, below, commercial sponges coated with graphite/magnetic nanoparticle nanocomposites effectively and efficiently absorb a wide variety of oils and smaller organic molecules from mixtures having various pHs (1 to 13) and salinity levels (0 to 1 M NaCl). (See also, FIGS. 6A-6D and 7.)

The mixture from which the hydrophobic material is to be recovered may be that which has been generated in a laboratory or a manufacturing plant or the like; a household environment (e.g., kitchen) or the like (e.g., restaurant); etc. However, the mixture may also be that which is part of a body of water such as a pool, a pond, lake, ocean, creek, stream, river, etc. The OHM porous materials may be used when such bodies of water become contaminated with oil due to leaks from windmills, boats, yachts, shipping vessels, cargo ships, etc. Another similar application includes soil remediation in which the mixture is a soil-water mixture contaminated with a hydrophobic material. Another similar application includes wastewater treatment in which water has become contaminated with a hydrophobic material, e.g., during fracking.

The type of contact of the OHM porous material and the water/hydrophobic material mixture is not particularly limited, but rather depends upon the morphology of the porous substrate of the OHM porous material, the type of hydrophobic material, and the application environment. By way of illustration, in a laboratory or similar environment, the porous substrate may be in the form of a planar membrane or a column packed with the porous substrate (e.g., in bead form) and the contact is carried out by passing the water/hydrophobic material mixture through the membrane or column. In a household or similar environment, the porous substrate may be in the form of a sheet or pad (e.g., facial/body wipe, mop head, sponge, etc.) and the contact is carried out by placing the OHM porous material on the water/hydrophobic material mixture. In an environment involving a body of water contaminated with a hydrophobic material such as oil, the porous substrate may be in the form of a sponge or a foam and the contact is carried out by immersing (partially or completely) the OHM porous material into the body of water. Similarly, the OHM porous material may be used as the filling in booms configured to contain an oil spill.

The type of contact and the period of time of contact may be adjusted to optimize (e.g., maximize) the absorption/recovery of the hydrophobic material by the OHM porous material. These parameters also depend upon the morphology of the porous substrate of the OHM porous material, the type of hydrophobic material, the application environment, as well as the relative size of the OHM porous material to the volume of the mixture. These parameters may be adjusted so that the OHM porous material absorbs/recovers at least 80%, at least 85%, at least 90%, at least 95%, at least 98% or 100% of the hydrophobic material from the mixture. At the same time, these parameters may be adjusted to minimize the amount of water absorbed by the OHM porous material. In embodiments, the OHM porous material absorbs no more than 20% water, no more than 15% water, no more than 10% water, no more than 5% water, no more than 1% water or 0% water from the mixture. By way of illustration, in embodiments, the OHM porous material absorbs 30 times its weight of hydrophobic material from the mixture. Thus, for mixtures having a hydrophobic material content of 30 weight % or less, the recovery of the hydrophobic material from the mixture by the OHM porous material may be 100%.

Figure 10:
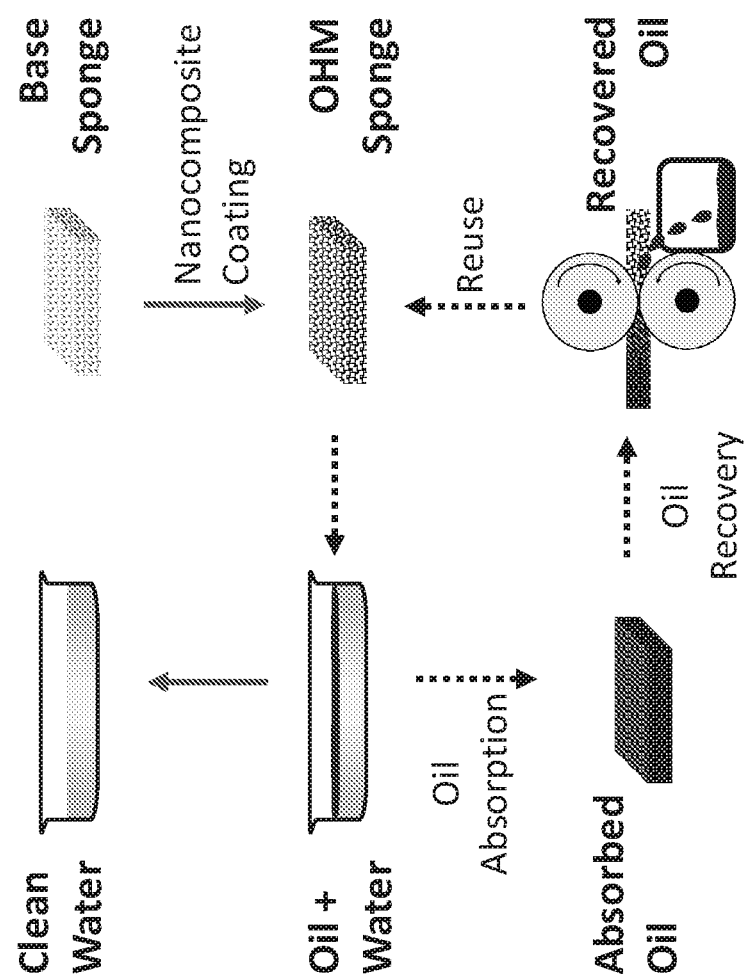
FIG. 10 depicts a schematic illustration of releasing oil from an illustrative OHM sponge using mechanical compression.

After the contacting step, the absorbed hydrophobic material may be released from the OHM porous material. Again, the release technique may depend upon the morphology of the porous substrate of the OHM porous material, the type of hydrophobic material, and the application environment. An illustrative release technique is depicted in FIG. 10, showing an OHM sponge containing absorbed oil that is deformed (e.g., by compressing, squeezing, etc.) to release the absorbed oil from the OHM sponge. Some or all of the released oil may be recycled for use in other applications.

Figure 8:
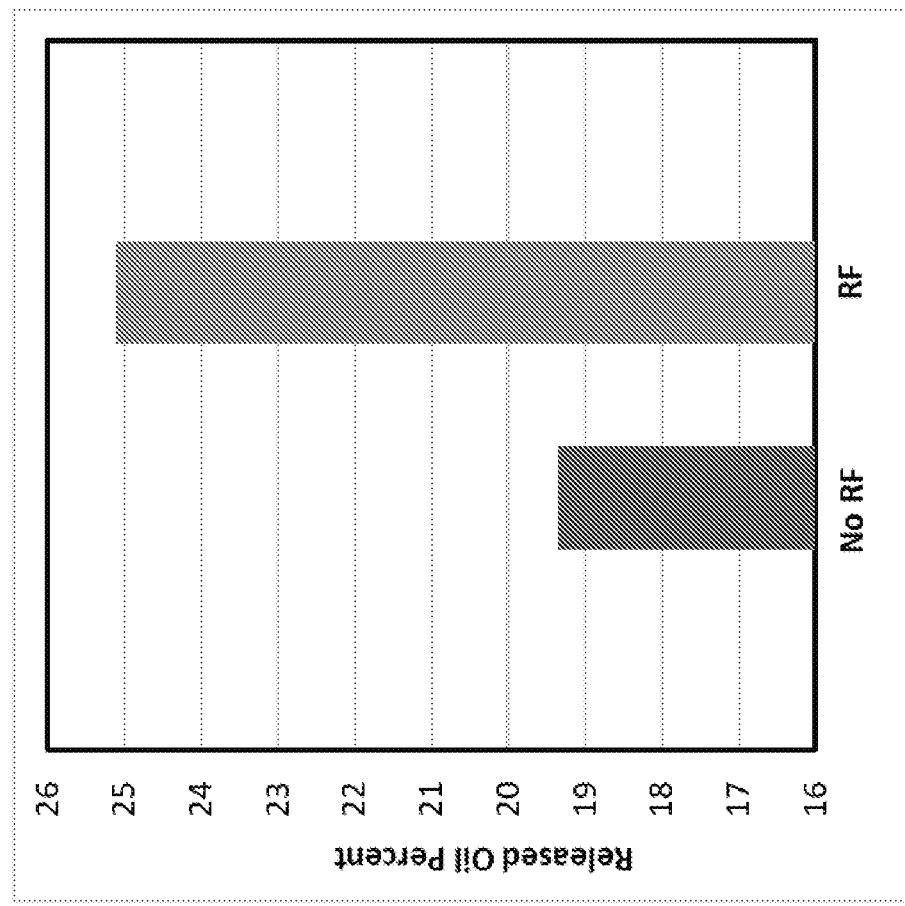
FIG. 8 compares the amount of oil released from an illustrative OHM sponge under radio-frequency (RF) field and no RF field. Due to thermal activation of the magnetic nanoparticles in the nanocomposite coating under RF field, the oil release in the OHM sponge under RF field was significantly higher than in the control (no RF) sample.

Another illustrative release technique leverages the magnetic nanoparticles present in the nanocomposite coating. Such a technique comprises exposing the hydrophobic material-containing OHM porous material to a radio-frequency (RF) field for a period of time. The RF field thermally activates the magnetic nanoparticles of the nanocomposite to generate heat. Without wishing to be bound to any particular theory, it is believed the heat reduces the viscosity of the absorbed hydrophobic material to induce release from the nanocomposite coating. The RF field strength, frequency, and time may be adjusted to optimize (e.g., maximize) release of the hydrophobic material. Release of oil from commercial sponges coated with graphite/magnetic nanoparticle nanocomposites via a RF field is further described in the Example below and is illustrated in FIG. 8. The nanocomposite coating may include other materials that may be stimulated via other techniques and which may facilitate the release of the hydrophobic material. For example, Au nanorods and/or $MoS_2$ can be photothermally activated and hence can generate heat in presence of near infra-red light.

The method of recovering hydrophobic materials may further comprise repeating the contact and release steps one or more additional times, thereby highlighting another advantage of the OHM porous materials—reusability. In fact, the Example below demonstrates that commercial sponges coated with graphite/magnetic nanoparticle nanocomposites may be reused many times to recover oil from oil-water mixtures with little change in their absorption capabilities. (See also, FIGS. 6B and 7.)

The presence of magnetic nanoparticles in the OHM porous materials provides an additional advantage in that the OHM porous materials may be exposed to a magnetic field (e.g., from a permanent magnet, an electromagnet, gradient magnetic field, etc.) at any point during the recovery method to move the OHM porous material, e.g., to a different location including a different location within the water/hydrophobic material mixture. This is particularly useful when the volume of the water/hydrophobic material is significantly greater than the size or capacity of an individual OHM porous material.

EXAMPLE

Experimental

Sponge sample preparation. Polyurethane (PU) sponge was purchased from McMaster Carr and cut into pieces of size 1 cm×1 cm×2 cm. The cut pieces were used as it is.

Synthesis of $Fe_3O_4$ Nanoparticles: 25 ml (0.2 M) $FeCl_3.4H_2O$, 25 ml (0.1 M) $FeCl_2.6H_2O$, and 50 ml 1 M NaOH were mixed. The mixture was left to settle down and the precipitate was collected and washed with water and dried in the oven at 60° C. overnight.

Synthesis of Graphite/$Fe_3O_4$ Nanocomposite: Three different methods were used to prepare graphite/$Fe_3O_4$ nanocomposites:

Method 1—800 mg $Fe_3O_4$ Nanoparticles (5 nm) (from above), 800 mg graphite (flake size ~50 µm), and 800 mL of deionized (DI) water were charged into a 2 L beaker and probe sonicated for 1 hour. The mixture was left to settle down and the precipitate was collected and washed with water and dried in the oven at 60° C. overnight.

Method 2–500 mg graphite and 50 ml 1 M NaOH solution in water were mixed and sonicated. After 10 minutes, stock solution (25 ml 0.2 M $FeCl_3.4H_2O$+25 ml 0.1 M $FeCl_2.6H_2O$) was added during sonication and sonication was continued for 10 minutes to 1 hour. The mixture was left to settle down and the precipitate was collected and washed with water and dried in the oven at 60° C. overnight.

Method 3—A flow reactor with three channels (although four may be used as shown in FIG. 2) was used for this method. In channel 1, partially exfoliated graphite (pre-sonicated 10 mins, 5 mg/ml, 100 ml) in water was used. In channel 2, nanoparticle precursors (25 ml 0.2 M $FeCl_3.4H_2O$+25 ml 0.1 M $FeCl_2.6H_2O$) was used. In channel 3, 1 M NaOH solution in water was used. All three stock solutions were run through 3 different channels via peristaltic pump and mixed. The output stream was sonicated. Different flow rates were used for the output stream, e.g., from 30 mL/min to 150 mL/min. Next, the mixture was left to settle down to induce precipitation. The precipitate was collected and washed with water and dried in the oven at 60° C. overnight.

Fabrication of oleophilic, hydrophobic, magnetic (OHM) sponge—coating of Graphite/$Fe_3O_4$ nanocomposite on polyurethane sponge. PU sponges were wetted in water first and then dipped into the graphite/$Fe_3O_4$ nanocomposite solution (formed either via method 1, 2, or 3) in such a way that they were hanging 3 cm below the meniscus of the nanocomposite solution. Probe sonication was applied for 10 minutes and was turned off afterwards, resulting in the in-situ formation of a coating of the graphite/$Fe_3O_4$ nanocomposite on the PU sponge. The mixture was allowed to settle down and the nanocomposite coated PU sponges (referred to as OHM sponges) were removed from solution after 1 hour and washed with water to remove any excess nanocomposite material from the sponge. The nanocomposite coated PU sponges were left in the oven at 60° C. for 1 hour.

Structural Characterization

X-ray Diffraction (XRD): The crystal structure of the composite was observed on Scintag powder XRD.

Raman: Raman spectra were taken on a Horiba LabRam Confocal Raman with the 633 nm laser using the WY Detector, ×100 objective sense, 600 gr/mm filter and 10% filter. This pattern represents an average of 207 spectra in a small map area, where each spectrum had an acquisition time of 3 seconds for 2 accumulations.

Scanning Electron Microscopy (SEM): Images were collected with the Concentric Backscattered Detector (CBS) on the SEM FEI Quanta 650 operated at 30 kV at 0.83 Torr. SEM images of the ultramicrotomed samples were acquired with the backscatter detector on the Hitatchi S-3400 operated at 20 kV in low vacuum mode.

Transmission Electron Microscopy/Scanning Tunneling Electron Microscopy (TEM/STEM): Electron energy loss spectroscopy (EELS) was performed on ultramicrotomed sections of the OHM sponge in Dual EELS acquisition mode with a Gatan GIF Quantum ER mounted on a JEOL ARM200CF. The instrument was operated at 200 kV in STEM mode with a camera length of 6 cm. Beam-induced changes to the π peak in the material after spectra were not observed. The convergence semi-angle of the probe was 21 mrad and spectrometer was operated with a dispersion of 0.025 eV/channel and a high loss energy shift in Dual EELS of 270 eV; the full width at half maximum of the zero-loss peak was measured as 1 eV under these conditions. Using a spectrometer entrance aperture of 5 mm gave a collection semiangle of 60 mrad. Energy dispersive X-Ray spectroscopy (EDS) was performed simultaneously to EELS. EDS on ultramicrotomed sections of the OHM sponge was performed with a Hitachi HD 2300 Scanning Transmission Electron Microscope operated at 200 kV and equipped with 2 SDD EDS detectors. For the EDS map, 100 frames were collected and averaged over nearby pixels using a 5×5 kernel.

Inductively Coupled Plasma-Mass Spectrometry (ICP-MS)—The elemental analysis was confirmed via ICP-MS.

Magnetic Characterization

M-H hysteresis loops and field-cooled (FC)/zero-field-cooled (ZFC) magnetization curves of $MFe_2O_4$ magnetic nanoparticles were recorded using a physical property measurement system (Quantum Design Dyanacool-PPMS).

Mass Absorption Capacity

To calculate mass absorption capacity of the OHM sponge for a particular oil, weight of OHM sponge was measured before and after the oil absorption. The mass absorption capacity (C) was calculated according to the following formula: $C=(W2-W1)/W1$ where W1 and W2 represent the weight of the OHM sponge before and after the oil absorption, respectively.

Oil Absorption, Recovery, and Reuse

All the oil absorption experiments were carried out at room temperature. 5 ml of oil (in some cases dyed with oil red O for visualization) was added to 20 ml deionized (DI) water. A piece of OHM sponge (size 1 cm×1 cm×1 cm) was introduced at the oil/water interface. After 5 minutes, the OHM sponge was collected and left to drain for 5 minutes to remove the excess oil. The mass absorption capacity was calculated. Oil was recovered (more details in next paragraph) and the same cycle was repeated 10 times to demonstrate the reusability of the OHM sponge. For salinity and pH experiments, various amounts of acid (HCl), base (NaOH) and salt (NaCl) were mixed with water to tune the pH or salinity of water and then oil absorption experiments and calculation of mass absorption capacity were carried out.

Oil was recovered by two approaches: (a) Mechanical, where oil was recovered by squeezing out oil laden OHM sponge under 14" roller of a Calliger Hand Crank Clothes Wringer. (b) Stimulus, where radio frequency (RF) field was used as external stimuli. Oil laden OHM sponge was kept under RF field for 5 minutes. RF field induced thermal activation of magnetic nanoparticles caused release of oil from the oil laden OHM sponge and amount of released oil was calculated by weighing the OHM sponge before and after application of RF field. The process was repeated 10 times and oil recovery was calculated by adding amount of released oil in each cycle. RF field was generated in an MSI Automation Inc. Hyperthermia Research System RF generator at a frequency of 300 kHz and a power of 5 kW. The oil laden OHM sponge was placed inside the 5 cm coil generating the AC magnetic field of 5 kA/m.

Results and Discussion

Three different methods were used to synthesize the graphite/$Fe_3O_4$ nanocomposite. In method 1, dry $Fe_3O_4$ nanoparticles (typical size 5-20 nm) and graphite powder were mixed in water and sonicated. In method 2, graphite was exfoliated in water, and during exfoliation, $Fe_3O_4$ nanoparticles were grown by adding Fe precursors. In method 3, partially exfoliated graphite was passed through an output channel and $Fe_3O_4$ nanoparticles were grown in the same output channel. This way, the exfoliated graphite+$Fe_3O_4$ NPs mixture was produced at the microliter scale and in a continuous manner. This achieves in situ nucleation and growth of $Fe_3O_4$ nanoparticles on exfoliated graphite (exfoliated pieces contained up to a few layers of graphene). FIGS. 1 and 2 illustrate the general synthetic scheme of making the graphite/$Fe_3O_4$ nanocomposite in which $Fe_3O_4$ nanoparticles are grown simultaneously with exfoliation and left to reassemble/restack, resulting in a superior graphite/$Fe_3O_4$ nanocomposite, as further described below. Flow reactor methods such as method 3 and that illustrated in FIG. 2 also allow for the large-scale production of nanocomposite. By way of illustration, a total of 4.5 L (36 g) of the nanocomposite in an aqueous solution was produced in 30 minutes. This is enough nanocomposite to produce 1200 g (1.32 $ft^3$) of OHM sponge.

FIG. 3 illustrates the process of coating the PU sponge with the graphite/$Fe_3O_4$ nanocomposite.

TEM images were obtained for graphite/$Fe_3O_4$ nanocomposites formed using each of the three methods (data not shown). The TEM images of the graphite/$Fe_3O_4$ nanocomposites formed using methods 1 and 2 show that $Fe_3O_4$ nanoparticles were integrated on the surface and within layers of graphite flakes. However, most of the $Fe_3O_4$ nanoparticles clustered into larger aggregates. By contrast, the TEM images of the graphite/$Fe_3O_4$ nanocomposites formed using method 3 showed that the nanoparticles were uniformly dispersed across and throughout the graphite. These nanocomposites were free of nanoparticle aggregates.

In addition, FIG. 4A shows the XRD of an uncoated PU sponge (bottom) and a PU sponge (top) coated with the graphite/$Fe_3O_4$ nanocomposite formed via method 3. Peaks characteristic of PU, graphite, and $Fe_3O_4$ are present for the coated PU sponge, while only PU peaks are present in the uncoated PU sponge. The large (002) peak at $2\Theta=24\text{-}28°$ confirms that the nanocomposite coated on the PU sponge contains graphite and is free of isolated graphene. FIG. 4B shows the Raman spectra of pristine graphite (bottom) and the same nanocomposite of FIG. 4A. The spectrum of the nanocomposite shows the characteristic peaks of graphite, i.e., the G peak at 1540 $cm^{-1}$ that is higher than the 2D peak and the presence of an additional shoulder in the 2D peak of graphite. This again confirms that the nanocomposite contains graphite and is free of isolated graphene.

The remaining discussion of results refers to the uncoated PU sponge and the PU sponge (top) coated with the graphite/$Fe_3O_4$ nanocomposite formed via method 3.

Morphological characterization of the PU and OHM sponge was accomplished via a manifold of imaging techniques (data not shown). SEM micrographs show the morphology of the PU and OHM sponges, respectively, showing that the sponge matrix is composed of elongated, entangled strands, the strands having a uniform diameter of ~50 µm. Ultramicrotomed cross section images taken in annular dark field (ADF) mode and bright field (BF) mode show that the nanocomposite coating of the OHM sponge is uniform. In addition, the interfaces between the sponge strands and the nanocomposite coating and between the nanocomposite coating and the resin used in the sample preparation were sharp and clear. The presence of both Fe and graphite (as opposed to graphene) in the nanocomposite coating and the good attachment of the nanocomposite coating to the sponge matrix was confirmed using a variety of techniques, including high-angle annular dark-field (HAADF) images, EDS, EELs.

Figures 5A, 5B:
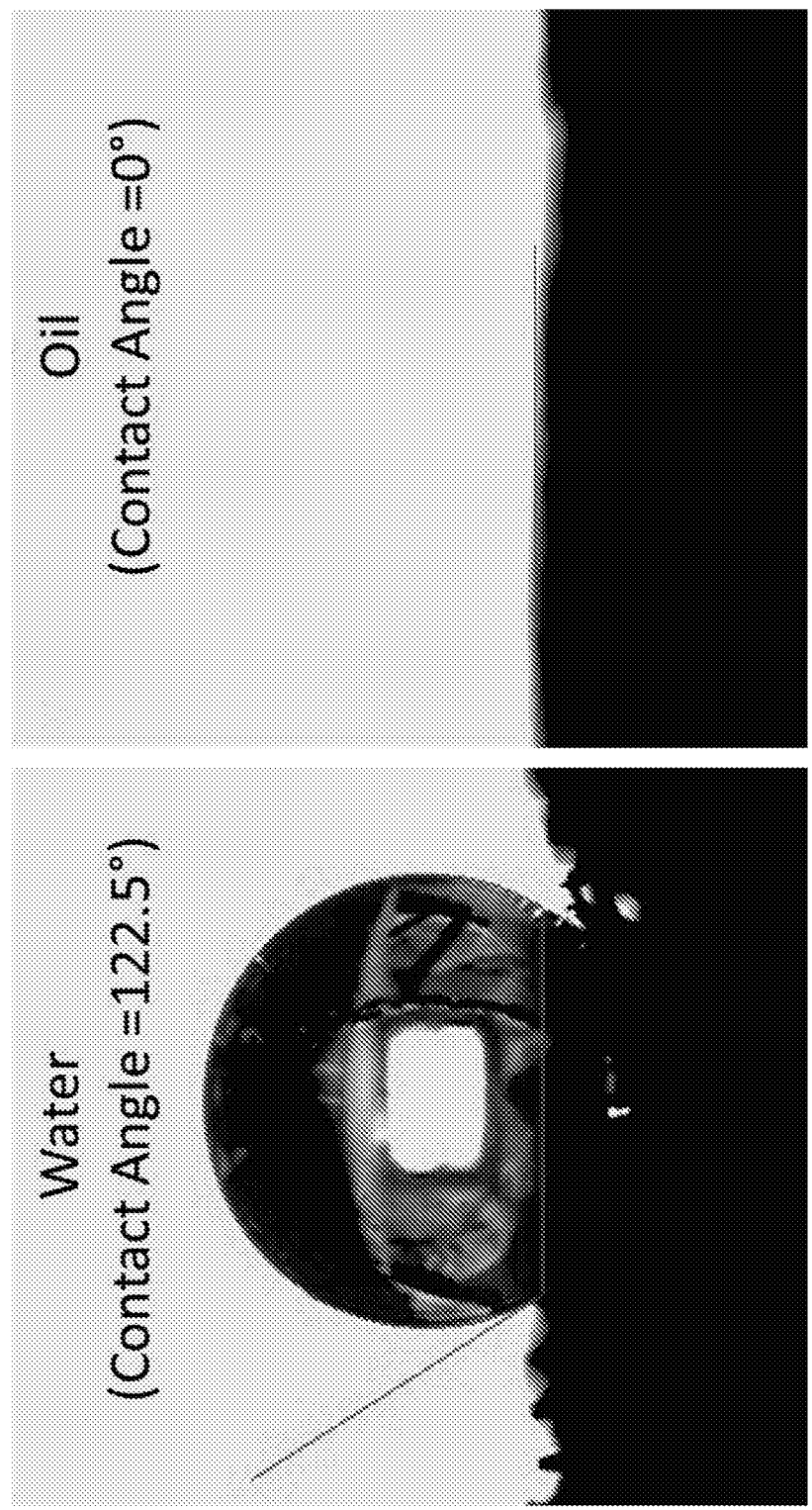
FIGS. 5A-5B show images of contact angle measurements of an illustrative OHM sponge using water (FIG. 5A) and oil (FIG. 5B).

The oleophilic and hydrophobic characteristics of the OHM sponge are demonstrated in FIGS. 5A-5B. As shown in FIG. 5A, the water droplet stays as it is on the OHM sponge while as shown in FIG. 5B, the oil spreads out and gets absorbed into the sponge. These figures also show the results of contact angle measurements with water and oil on the OHM sponge, respectively. The high contact angle of 122.5° for water confirms the hydrophobic nature of the OHM sponge while the ~0° contact angle for oil confirms its oleophilic nature. Moreover, the hydrophobicity of OHM sponge remained the same for water droplets with different pHs and salinity levels. Similar water contact angles were observed for pH 3 to 10 (133° to 138°) and salinity levels of 0M to 2M NaCl (123° to 133°).

Due to its simultaneous oleophilic and hydrophobic nature, the OHM sponge selectively absorbs oil from oil/water mixtures, including hydrophobic materials that are heavier than water (such as chloroform). To demonstrate its versatility in selectively absorbing oil from oil/water mixtures, the OHM sponge was been tested with 7 types of oil/hydrophobic materials varying in density and viscosity including hexane (0.66 g/mL/0.30 cP), octane (0.70 g/mL/0.54 cP), decane (0.73 g/mL/0.80 cP), dodecane (0.75 g/mL/1.36 cP), chloroform (1.47 g/mL/0.53 cP), motor oil (0.87 g/mL/180 cP), and pump oil (0.88 g/mL/150 cP). The OHM sponge was able to selectively absorb all the hydrophobic materials. The mass absorption capacity (g/g) of the OHM sponge was calculated by dividing weight of absorbed hydrophobic material by weight of a blank OHM sponge. As shown in FIG. 6A, the mass absorption capacity for each hydrophobic material varied, but a capacity of up to 30 g/g was observed. The hydrophobic material was recovered by wringing the sponge and cycles of hydrophobic material absorption/recovery was repeated 10 times to demonstrate re-usability of the OHM sponge. As shown in FIG. 6B, even after 10 cycles of use, the OHM sponge retained more than 90% of its mass absorption capacity. Mass absorption capability was also tested at various pHs and water salinity. As shown in FIGS. 6C and 6D, no significant changes in mass absorption capacity was observed.

Figure 7:
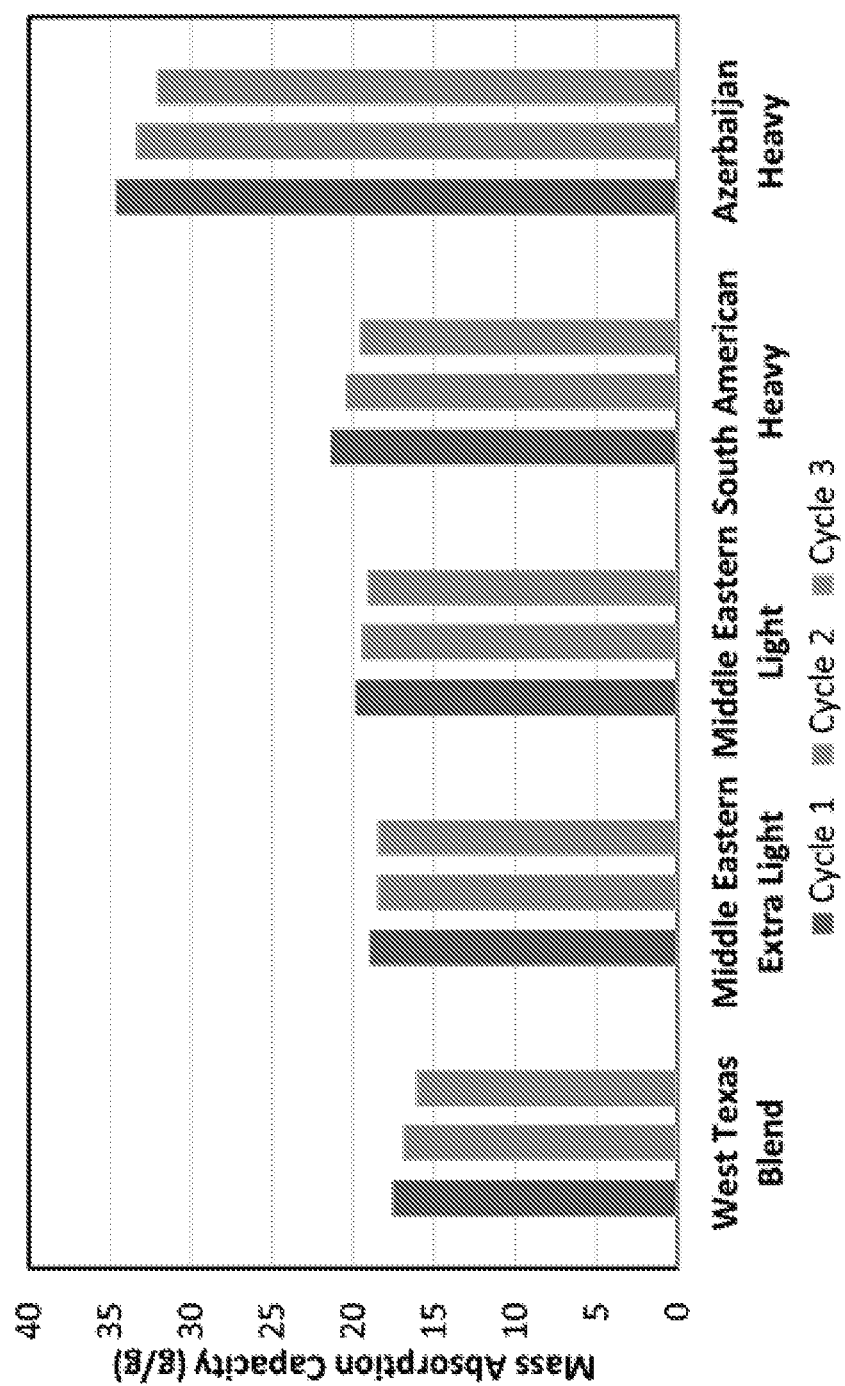
FIG. 7 shows the oil absorption capacity of an illustrative OHM sponge used to recover various types of crude oil.

Oil absorption behavior of the OHM sponge was also tested with 5 different types of crude oil samples. As shown in FIG. 7, the OHM sponge was successful in removing all the crude oil samples, which the specific mass absorption capacity dependent upon the viscosity and density of the crude oil.

Regarding mass absorption capacity, it is noted that a value of 30 g/g means that 100 g of hydrophobic material can be absorbed by 3.33 g of OHM sponge. However, graphite constitutes of only 3 weight % of the OHM sponge. Hence, effectively 100 g of hydrophobic material is absorbed by 0.1 g of graphite. This makes the absorption capacity of the graphite in the OHM sponge 1000. This extremely high number is believed to be due to enhancement in graphite's morphology due to the intercalation of the $Fe_3O_4$ nanoparticles as well as the 95-97% porosity of the PU sponge. Clearly, this provides the OHM sponge with an enormous capacity to capture and store hydrophobic materials such as oil.

The presence of magnetic nanoparticles such as $Fe_3O_4$ nanoparticles also provides additional functionality to the OHM sponge, including the ability to achieve controlled movement of the OHM sponge in presence of external magnetic field. The magnetic response of the OHM sponge was evaluated. When a permanent magnet (NdFeB) is brought close to the OHM sponge, the OHM sponge immediately responds and sticks to the magnet due to the high magnetic susceptibility and superparamagnetic properties of the magnetic nanoparticles. Any type of permanent magnet or strong magnet or electromagnet may be used. The magnetic properties of the magnetic nanoparticles were confirmed by M-H hysteresis loops (not shown). The M-H loops of $MFe_2O_4$ (M=Fe, Mn) magnetic nanoparticles showed no hysteresis, high magnetic susceptibility, and superparamagnetic behavior at room temperature. The saturation magnetization (Ms) of $Fe_3O_4$ and $MnFe_2O_4$ magnetic nanoparticles were found to be 65 and 75 emu/g, respectively. To find the blocking temperature ($T_b$), where they transit from ferromagnetic to superparamagnetic, field-cooling (FC) and zero-field-cooling (ZFC) magnetization plots were measured at 100 Oe (data not shown). The $T_b$ of $Fe_3O_4$ and $MnFe_2O_4$ magnetic nanoparticles were found to be at 35 and 75K, respectively. These characteristics are ideal to maintain a uniform dispersion in formulations with water/aqueous solution. By contrast, ferromagnetic magnetic nanostructures can clump together and destabilize the formulation. As a result, a uniform, nanoparticle aggregate-free coating of the nanocomposite on an underlying substrate, such as a sponge is not possible.

In addition to the magnetic response, the ability of the magnetic nanoparticles to heat under radio-frequency (RF) field provides an additional mode to release the adsorbed component without any squeezing or mechanical operation. Since the magnetic nanoparticles are uniformly dispersed throughout the nanocomposite coating in the OHM sponge, components (e.g. oil) absorbed in the OHM sponge may be desorbed due to local heating provided by the magnetic nanoparticles. A time temperature plot of a $MnFe_2O_4$/graphite nanocomposite slurry under RF field showed it can be thermally activated to generate significant heating under RF field (data not shown). The whole release process can be programmed in a stimulated and remote manner by controlling the RF field. To demonstrate oil release, Azerbaijan heavy crude oil (viscosity of 8000-10000 cP) was used. In addition, $MnFe_2O_4$ magnetic nanoparticles were selected due to their high thermal activation properties (or SAR). A graphite/$MnFe_2O_4$ nanocomposite was formed according to method 3 and used to coat PU sponges, thus forming OHM sponges. Two OHM sponges, laden with Azerbaijan heavy crude oil, were selected and one was kept under RF field (300 kHz, 5 kW) for 50 minutes while other was kept at ambient conditions as a control sample. Both the OHM sponges were weighed before and after application of RF field and the amount of released oil was calculated. Some oil release in the control (no RF) sample may have been due to gravity. However, the oil release in the sample kept under RF field was significantly higher than the control (no RF) sample (FIG. 8). The excess release may be understood as follows: magnetic nanoparticles in the nanocomposite coating generated heat due to thermal activation under RF field, the heat was uniformly conducted throughout the coating due to excellent thermal conductivity of graphite, and the generated heat reduced the viscosity of the adsorbed oil, facilitating the release of the oil. These results demonstrate that an RF field can be used to desorb oil in a remote and controlled manner, making the on-demand recovery of oil possible.

Conclusions

In summary, this Example reports the formation of an OHM sponge by coating a commercially available polyurethane sponge with a multifunctional nanocomposite material. The OHM sponge serves as a versatile oil remediation platform. The porosity of the sponge provides a high volume in which to store hydrophobic materials such as oil while the nanocomposite coating provides a multifunctional surface for selectively adsorbing the hydrophobic material from water. The OHM sponge is superior to existing oil remediation approaches: First, it is eco-friendly as it has no carbon footprint or and does not present a danger to marine life. Second, it is efficient due to its re-usability, selectivity, and on-demand recovery. Its magnetic nature also allows controlled movement under magnetic field, oil removal beneath the water surface, and oil recovery in a remote and stimulated manner. Finally, it is economic since it can be made in large quantities with low cost and environmentally friendly raw materials/methods. The OHM sponge may be used for a variety of water and air remediation applications. By modulating the nanocomposite coating on a sponge or other porous substrate, other pollutants in water and air can be selectively removed and recovered. The RF stimulated release of adsorbed components in a remote manner allows one to remove and recover the pollutants that cannot be recovered by squeezing or wringing the porous substrate. In addition, recovery can be further tuned by modulating the RF field strength, frequency, and time.

Additional Results

OHM sponge as an oil-water separator (filter). In this experiment, the OHM sponge was used as an oil-water separator from a mixture in which oil was present in the minority (1-2000 ppm). When oil-water mixture is passed through a column of pieces of the OHM sponge, the oil gets absorbed into OHM sponge and clean water passes through as a filtrate. For this experiment, an oil-water emulsion with 2000 ppm oil in water was prepared by mixing 2 g of oil in 1 L of water and pulsing it in a blender for 30 seconds. A column was set up in which an OHM sponge prepared as described above was cut into small cubic pieces having dimensions of 0.25" to 0.5" to maximize the surface area and residence time (time taken to pass the oil-water mixture through the column). The sponge pieces were placed into a cylindrical column having a diameter of 0.5" and a height of 3". The oil-water mixture was poured into the column at the top and the filtrate was collected from the bottom of the column.

The oil was dyed with Oil Red O in order to qualitatively and quantitatively measure oil absorption. After filtering, the disappearance of red color indicated that most of the oil from the oil-water mixture was absorbed by OHM sponge. To quantify the amount of removed oil, absorbance at 470 nm was recorded before and after filtration. There was a clear drop in absorbance after filtration. The oil removal capacity (%) was calculated by the following formula: Oil Removal Capacity (%)=(Abs@470 nm before filtration–Abs@470 nm after filtration)/(Abs@470 nm before filtration).

Three different columns were set up with different packing densities of the OHM sponge: 500, 700, and 900 mg of OHM sponge, respectively. 10 mL of dyed oil-water mixture (2000 ppm oil) was passed through each column. Oil removal capacity was measured/calculated as described above. The results showed that the column with 500 mg OHM sponge removed 45% of the oil in 10 seconds; the column with 700 mg OHM sponge removed 62% of the oil in 25 seconds; and the column with 900 mg OHM sponge removed 74% oil in 45 seconds.

Figure 9:
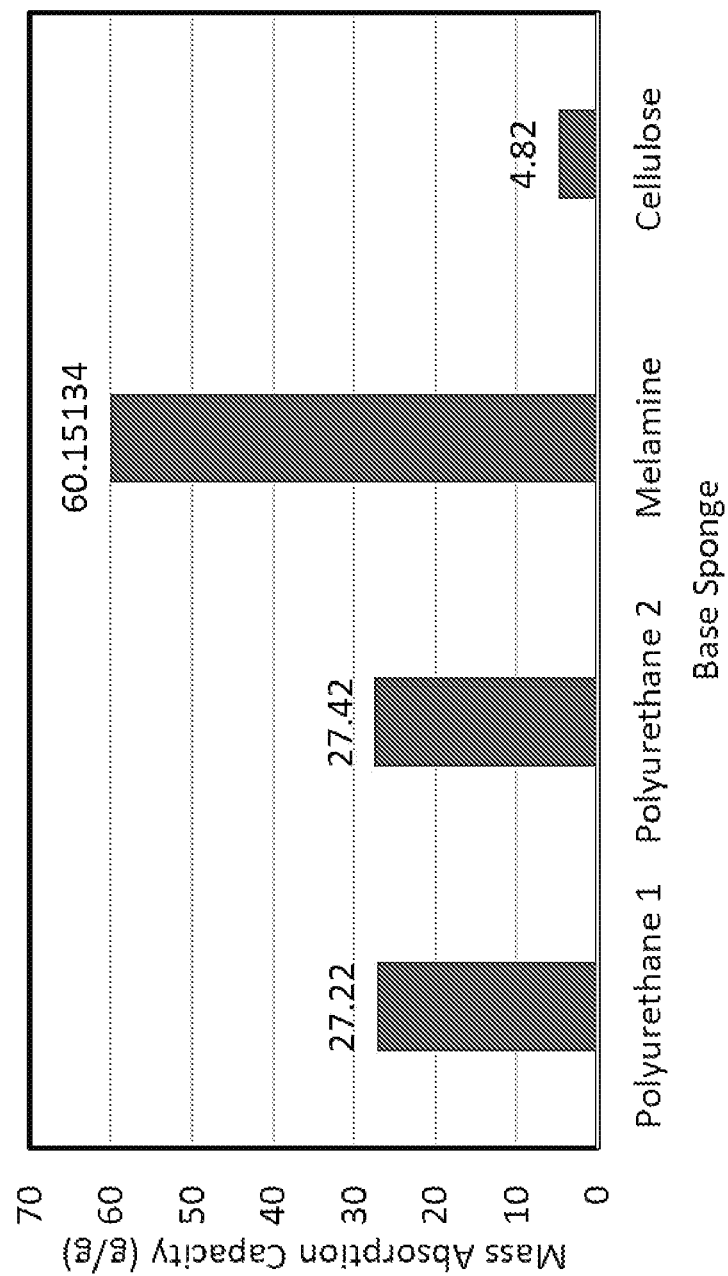
FIG. 9 shows the oil absorption capacity of illustrative OHM sponges used to recover a crude oil.

Effect of base sponge on mass absorption capacity of OHM sponge. A variety of OHM sponges were prepared as described above, but using different base sponges: two polyurethane sponges (from different vendors), one melamine, and one cellulose sponge. Mass absorption capacity was calculated based on American Standard Test Method (ASTM) 726-06 using Fisherbrand™ 19 Mechanical Pump Oil. The absorbed oil was recovered by wringing the OHM under rollers. The experiment was repeated for 20 cycles and average mass absorption capacity was calculated and plotted in FIG. 9. Average mass absorption capacity of each OHM sponge was found to be dependent on its base sponge's porosity and mechanical strength.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the invention in various embodiments and with various modifications as suited to the particular use contemplated. It is intended that the scope of the disclosure be defined by the claims appended hereto and their equivalents.

What is claimed is:

1. An oleophilic-hydrophobic-magnetic (OHM) porous material for recovering a hydrophobic material from a mixture, the OHM porous material comprising a porous substrate having a solid matrix defining a plurality of pores distributed through the solid matrix, the OHM porous material further comprising a coating of a nanocomposite on surfaces of the solid matrix,
    the nanocomposite comprising dimensional, layered material having nucleation sites interleaved between a plurality of layers of a multilayer stack of a plurality of layers of graphite, each graphite layer in the plurality of layers of graphite comprising multiple graphene layers and each graphite layer having nucleation sites thereon, the nanocomposite further comprising a plurality of layers of magnetic nanoparticles interleaved with the plurality of layers of graphite, wherein individual layers of magnetic nanoparticles in the plurality of layers of magnetic nanoparticles are each directly anchored on a surface of a graphite layer of the plurality of layers of graphite via the nucleation sites and individual layers of magnetic nanoparticles are each separated by a graphite layer of the plurality of layers of graphite, further wherein neighboring layers in the multilayer stack are held together via van der Waals forces such that the nanocomposite is free of isolated graphene layers.

2. The OHM porous material of claim 1, wherein the nanoparticles and the plurality of layers of graphite are unfunctionalized.

3. The OHM porous material of claim 1, wherein the magnetic nanoparticles comprise iron, iron oxide, or an alloy of iron or iron oxide.

4. The OHM porous material of claim 1, wherein the nanocomposite is free of aggregated magnetic nanoparticles.

5. The OHM porous material of claim 1, wherein the magnetic nanoparticles have an average diameter such that the magnetic nanoparticles exhibit superparamagnetic behavior.

6. The OHM porous material of claim 1, wherein the solid matrix is composed of polyurethane, cellulose, melamine, polyimide, acrylic, polyamide, polyester, polycarbonate, polyaramide, or combinations thereof.

7. The OHM porous material of claim 1, wherein the nanocomposite forms a coating on the solid matrix having an average thickness in a range of from 300 nm to 3 µm.

8. A method of recovering a hydrophobic material from a mixture, the method comprising contacting the OHM porous material of claim 1 with a mixture comprising a hydrophobic material for a period of time to absorb at least a portion of the hydrophobic material from the mixture onto the OHM porous material and provide the mixture with a reduced amount of the hydrophobic material.

9. The method of claim 8, wherein the hydrophobic material is an oil or a water insoluble organic compound or a water immiscible organic compound or combinations thereof.

10. The method of claim 8, further comprising releasing the absorbed hydrophobic material from the OHM porous material.

11. The method of claim 10, wherein the releasing is accomplished by exposing the OHM porous material to an external stimulus to generate heat.

12. The method of claim 11, wherein the external stimulus is a radio-frequency (RF) field applied for a period of time.

13. A method of making the OHM porous material of claim 1, the method comprising immersing the porous substrate in a formulation comprising the nanocomposite for a period of time to form the coating of the surfaces of the solid matrix, the method further comprising forming the nanocomposite by:
    (a) combining a first input stream of flowing fluid provided by a flow reactor, the first input stream comprising the graphite, a second input stream of flowing fluid provided by the flow reactor, the second input stream comprising a magnetic nanoparticle precursor material, and a third input stream of flowing fluid provided by the flow reactor, the third input stream comprising a nanoparticle nucleation agent, to form an output stream of flowing fluid;
    (b) sonicating the output stream for a period of time to induce exfoliation of the graphite into the graphite layers of the plurality of graphite layers and nucleation and growth of magnetic nanoparticles on the nucleation sites to form magnetic nanoparticle decorated graphite layers; and
    (c) inducing reassembly of the magnetic nanoparticle decorated graphite layers and precipitation of the nanocomposite within the liquid of the output stream.

* * * * *